United States Patent
Hart et al.

(10) Patent No.: US 11,493,399 B2
(45) Date of Patent: *Nov. 8, 2022

(54) PIPE PRESSURE TESTING METHOD AND APPARATUS

(71) Applicant: Reliance Worldwide Corporation, Poway, CA (US)

(72) Inventors: Dennis L. Hart, Incline Village, NV (US); Cristobal Gonzalez, Chula, CA (US); Virgil E. O'Neil, San Diego, CA (US); Jeffrey A. Jaramillo, Poway, CA (US); Larry D. Brown, Poway, CA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 260 days.

This patent is subject to a terminal disclaimer.

(21) Appl. No.: 16/863,570

(22) Filed: Apr. 30, 2020

(65) Prior Publication Data
US 2020/0256754 A1    Aug. 13, 2020

Related U.S. Application Data

(60) Continuation of application No. 15/234,958, filed on Aug. 11, 2016, now Pat. No. 10,656,042, which is a
(Continued)

(51) Int. Cl.
*F16L 55/10* (2006.01)
*G01M 3/02* (2006.01)
(Continued)

(52) U.S. Cl.
CPC ............. *G01M 3/022* (2013.01); *F16L 15/04* (2013.01); *G01M 3/04* (2013.01); *G01M 3/2815* (2013.01); *G01M 3/2853* (2013.01)

(58) Field of Classification Search
CPC ......... F16L 15/04; G01M 3/022; G01M 3/04; G01M 3/2815; G01M 3/2853
(Continued)

(56) References Cited

U.S. PATENT DOCUMENTS

| 1,054,150 A | 2/1913 | Thorsby |
| 1,133,714 A | 3/1915 | Elder |

(Continued)

FOREIGN PATENT DOCUMENTS

| JP | 5099348 A | 4/1993 |
| SU | 1610178 A1 | 11/1990 |
| WO | 200101101 A1 | 1/2001 |

*Primary Examiner* — James F Hook
(74) *Attorney, Agent, or Firm* — Barnes & Thornburg LLP

(57) ABSTRACT

A sealing device is provided for use with a fitting. The fitting has circular port and a flow path with a longitudinal axis. A circular port encircles a portion of the flow path opposite the port with the sealing device inserted into the port. The sealing device has a circular top with two opposing surfaces depending therefrom but inclined so the surfaces are closer at the top. A continuous sidewall joins the periphery of the two surfaces. The opposing surfaces are inclined and spaced apart further at the top than at an end opposite the top. A cylindrical hole through the opposing surfaces encircles the flow path during use.

21 Claims, 25 Drawing Sheets

Related U.S. Application Data continuation of application No. 14/517,520, filed on Oct. 17, 2014, now Pat. No. 9,964,461, which is a division of application No. 13/482,557, filed on May 29, 2012, now Pat. No. 8,887,768, which is a division of application No. 12/542,371, filed on Aug. 17, 2009, now Pat. No. 8,210,029.

(60) Provisional application No. 61/089,360, filed on Aug. 15, 2008.

(51) Int. Cl.
  *G01M 3/28* (2006.01)
  *F16L 15/04* (2006.01)
  *G01M 3/04* (2006.01)

(58) Field of Classification Search
  USPC .............................. 138/91, 92, 94, 94.3, 90
  See application file for complete search history.

(56) References Cited

U.S. PATENT DOCUMENTS

| | | | |
|---|---|---|---|
| 1,161,997 | A | 11/1915 | Thompson |
| 1,206,469 | A | 11/1916 | Rockwell |
| 1,357,974 | A | 11/1920 | Gorman |
| 1,928,316 | A | 9/1933 | Muto |
| 1,933,182 | A | 10/1933 | Pagon et al. |
| 2,031,151 | A | 2/1936 | Eulberg |
| 2,171,943 | A * | 9/1939 | Mueller .............. F16L 55/1604 137/599.08 |
| 2,616,655 | A | 11/1952 | Hamer |
| 2,636,713 | A | 4/1953 | Hamer |
| 2,701,117 | A | 2/1955 | Bashark |
| 2,815,187 | A | 12/1957 | Hamer |
| 2,823,887 | A | 2/1958 | Osinski |
| 2,828,146 | A | 3/1958 | Abbey |
| 2,845,954 | A | 8/1958 | Hamer |
| 2,946,349 | A | 7/1960 | Hamer |
| 2,953,015 | A | 9/1960 | Carrie |
| 3,051,201 | A | 8/1962 | Wilson |
| 3,069,132 | A | 12/1962 | Grove |
| 3,076,632 | A | 2/1963 | Smith |
| 3,154,106 | A | 10/1964 | Nooy |
| 3,165,124 | A | 1/1965 | Ausburn et al. |
| 3,232,577 | A | 2/1966 | Sargent |
| 3,316,929 | A | 5/1967 | Milette |
| 3,319,661 | A | 5/1967 | Shindler |
| 3,333,814 | A | 8/1967 | Sargent |
| 3,342,217 | A | 9/1967 | Low |
| 3,350,056 | A | 10/1967 | Blumenkranz |
| 3,442,295 | A | 5/1969 | Nooy |
| 3,586,031 | A | 6/1971 | Muller et al. |
| 3,598,154 | A | 8/1971 | Brundage |
| 3,737,180 | A | 6/1973 | Hayes, Jr. et al. |
| 3,770,301 | A | 11/1973 | Adams |
| 3,844,531 | A | 10/1974 | Grengs |
| 3,860,038 | A | 1/1975 | Forni |
| 3,941,349 | A | 3/1976 | Pierson |
| 3,945,604 | A | 3/1976 | Clarkson |
| 4,007,911 | A | 2/1977 | Clarkson |
| 4,019,371 | A | 4/1977 | Chaplin et al. |
| 4,112,969 | A | 9/1978 | Still |
| 4,122,869 | A | 10/1978 | Roberson, Sr. |
| 4,124,231 | A | 11/1978 | Ahlstone |
| 4,176,756 | A | 12/1979 | Gellman |
| 4,194,721 | A | 3/1980 | Nachtigahl |
| 4,225,115 | A | 9/1980 | Miller |
| 4,271,870 | A | 6/1981 | Butler et al. |
| D262,133 | S | 12/1981 | Fain |
| 4,343,332 | A | 8/1982 | Williams, III et al. |
| 4,407,171 | A | 10/1983 | Hasha et al. |
| 4,429,568 | A | 2/1984 | Sullivan |
| 4,452,278 | A | 6/1984 | Quinn |
| 4,456,026 | A | 6/1984 | Kantor |
| 4,479,670 | A | 10/1984 | Gabler |
| 4,522,224 | A | 6/1985 | Stalder et al. |
| 4,531,710 | A | 7/1985 | Tort |
| 4,532,957 | A | 8/1985 | Battle et al. |
| 4,548,386 | A | 10/1985 | Gladisch et al. |
| 4,602,504 | A | 7/1986 | Barber |
| 4,643,226 | A | 2/1987 | Balz |
| 4,658,861 | A | 4/1987 | Roberson, Sr. |
| 4,719,687 | A | 1/1988 | Nanny |
| 4,763,510 | A | 8/1988 | Palmer |
| 4,765,361 | A | 8/1988 | Clifford |
| 4,795,197 | A | 1/1989 | Kaminski et al. |
| 4,819,974 | A | 4/1989 | Zeidler |
| 4,895,181 | A | 1/1990 | McKavanagh |
| 4,944,484 | A | 7/1990 | Hostetler |
| 4,949,939 | A | 8/1990 | Almada |
| 5,004,210 | A | 4/1991 | Samo |
| 5,018,768 | A | 5/1991 | Palatchy |
| 5,076,095 | A | 12/1991 | Erhardt |
| 5,195,722 | A | 3/1993 | Bedner |
| 5,197,324 | A | 3/1993 | Keys |
| 5,232,199 | A | 8/1993 | Thrasher |
| 5,269,568 | A | 12/1993 | Courturier |
| 5,287,730 | A | 2/1994 | Condon |
| 5,385,373 | A | 1/1995 | Love |
| 5,445,359 | A | 8/1995 | Beson |
| 5,464,035 | A | 11/1995 | Heinecke |
| 5,494,079 | A | 2/1996 | Tiedemann |
| 5,524,663 | A | 6/1996 | Walsh et al. |
| 5,592,965 | A | 1/1997 | Rakieski |
| 5,620,166 | A | 4/1997 | Lord et al. |
| 5,653,423 | A | 8/1997 | Young et al. |
| 5,678,802 | A | 10/1997 | Lunder |
| 5,707,089 | A | 1/1998 | Fend |
| 5,782,499 | A | 7/1998 | Gfrerer et al. |
| 6,000,278 | A | 12/1999 | Hystad |
| D430,482 | S | 9/2000 | Stout, Jr. |
| 6,131,441 | A | 10/2000 | Berube et al. |
| 6,234,007 | B1 | 5/2001 | Pampinella |
| 6,299,216 | B1 | 10/2001 | Thompson |
| D451,984 | S | 12/2001 | Tigerholm |
| 6,341,619 | B1 | 1/2002 | Beninga |
| 6,422,064 | B1 | 7/2002 | Pampinella |
| 6,655,413 | B2 | 12/2003 | Condon et al. |
| 6,672,139 | B2 | 1/2004 | Pampinella |
| D488,852 | S | 4/2004 | Pampinella |
| 6,997,041 | B1 * | 2/2006 | Metzger .............. G01M 3/2853 251/319 |
| 7,013,711 | B1 | 3/2006 | Herbers |
| 7,021,337 | B2 | 4/2006 | Markham |
| 7,225,827 | B2 | 6/2007 | Maichel et al. |
| 7,281,411 | B2 | 10/2007 | Brewer |
| 7,325,442 | B1 * | 2/2008 | Pampinella .............. G01M 3/04 251/319 |
| 7,398,675 | B1 | 7/2008 | Metzger et al. |
| 7,731,242 | B2 | 6/2010 | Coscarella |
| 8,210,029 | B2 * | 7/2012 | Hart ........................ G01M 3/04 73/866.5 |
| 8,887,768 | B2 | 11/2014 | Hart et al. |
| 9,964,461 | B2 | 5/2018 | Hart et al. |
| 10,656,042 | B2 * | 5/2020 | Hart ..................... G01M 3/2853 |
| 2001/0015092 | A1 | 8/2001 | Pampinella |
| 2002/0023482 | A1 | 2/2002 | Pampinella |
| 2002/0140222 | A1 | 10/2002 | Pampinella |
| 2002/0148521 | A1 * | 10/2002 | Condon ................. F16L 55/105 138/94 |
| 2004/0134260 | A1 | 7/2004 | Pampinella et al. |
| 2004/0134261 | A1 | 7/2004 | Pampinella |
| 2008/0083267 | A1 | 4/2008 | Pampinella et al. |
| 2008/0134764 | A1 | 6/2008 | Brock |
| 2010/0037681 | A1 | 2/2010 | Hart et al. |
| 2015/0035238 | A1 | 2/2015 | Hart et al. |

\* cited by examiner

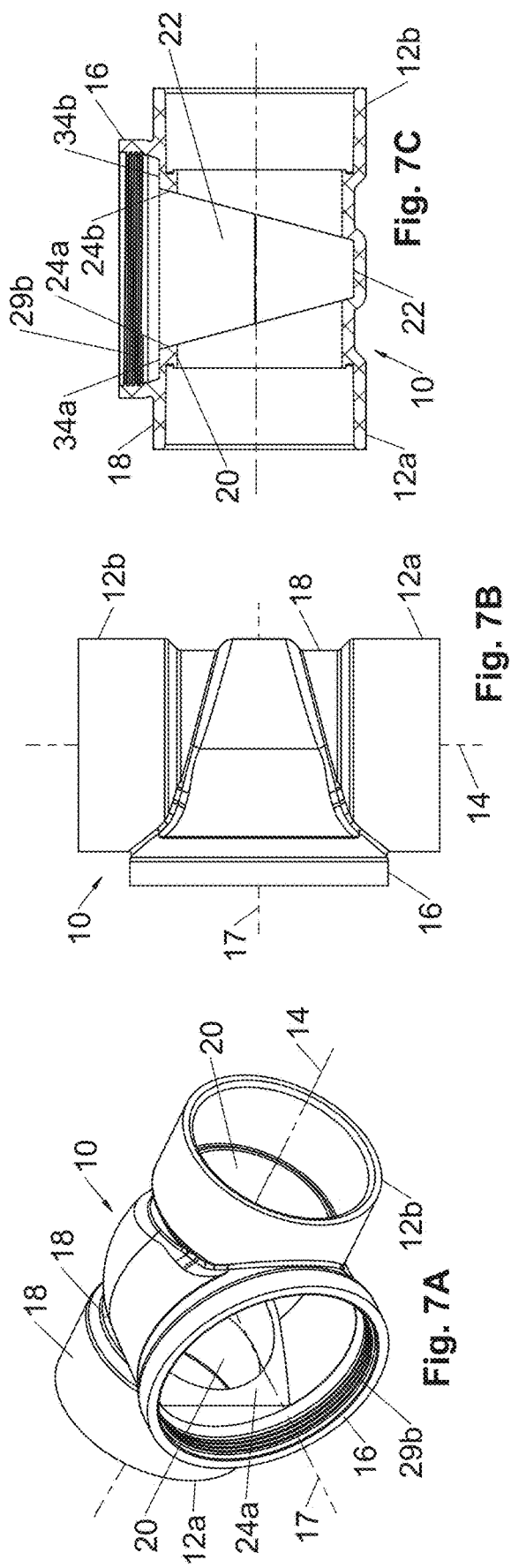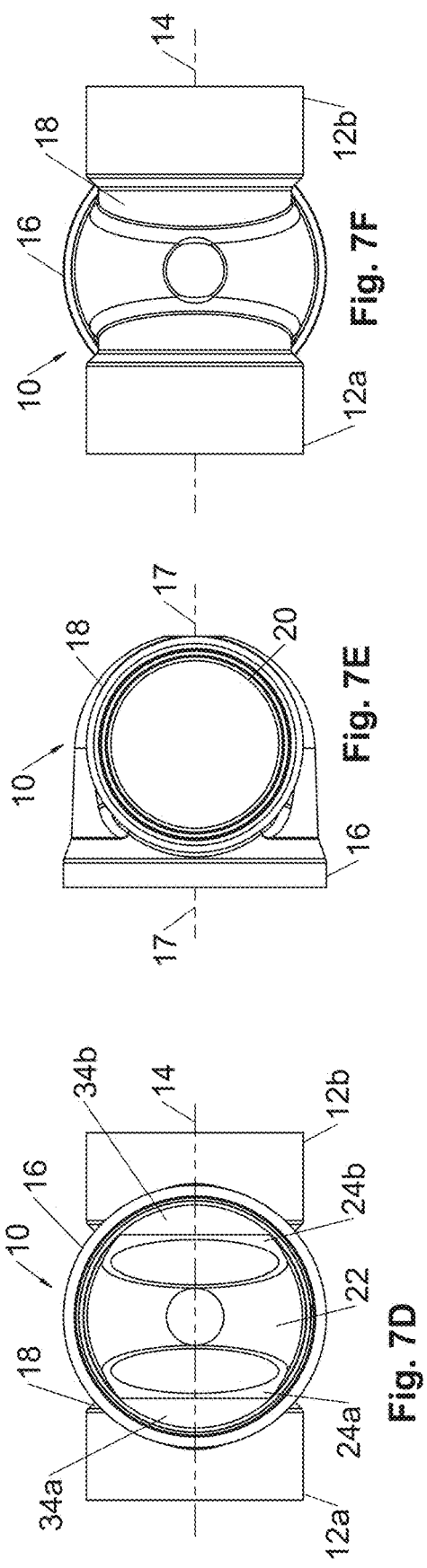

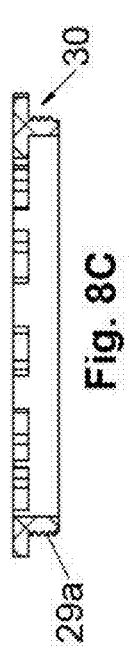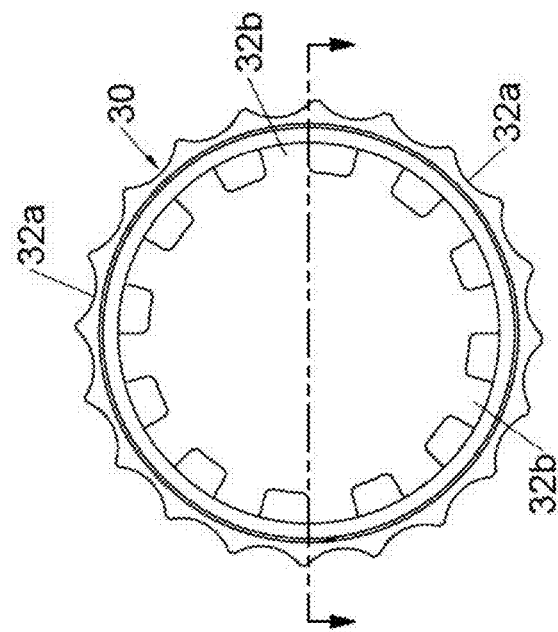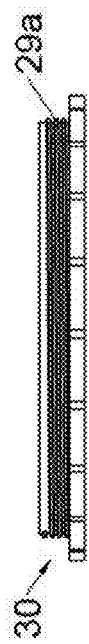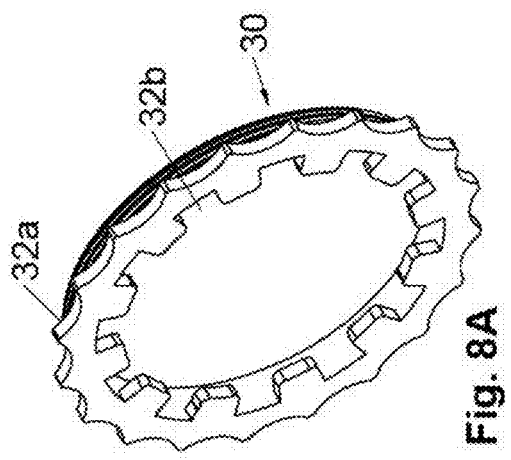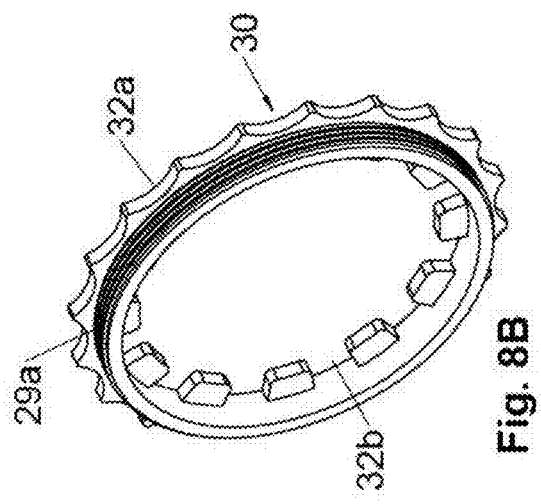

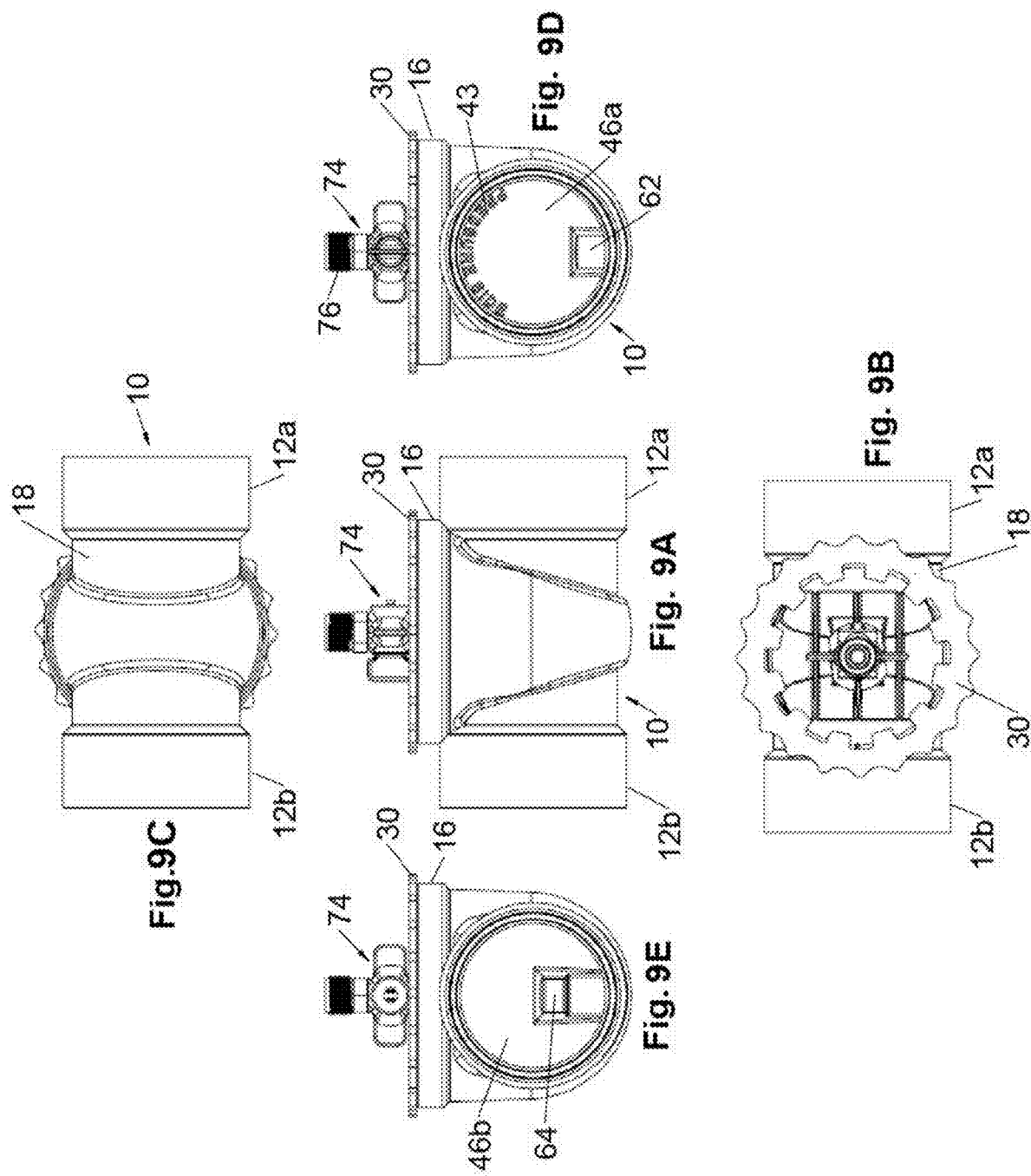

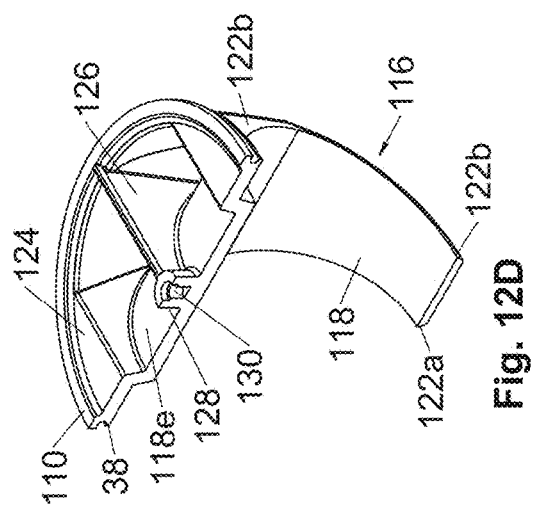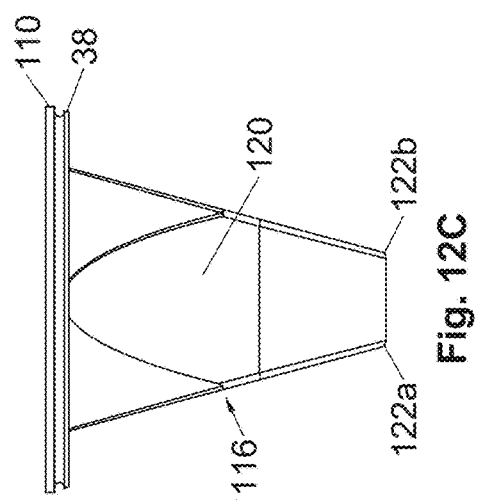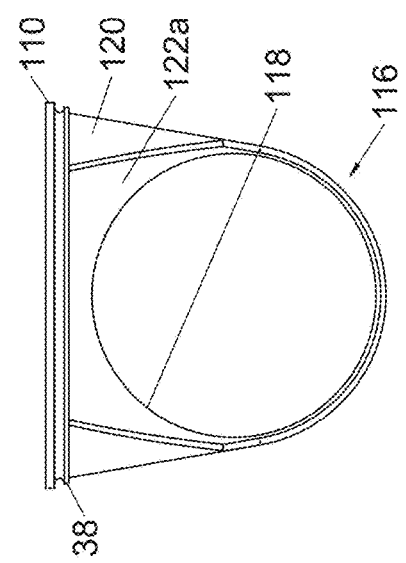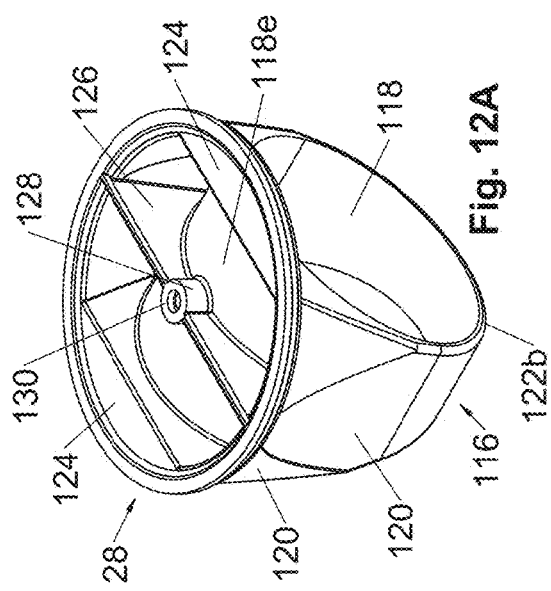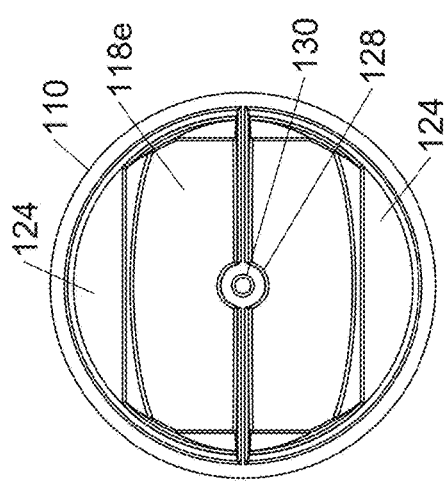

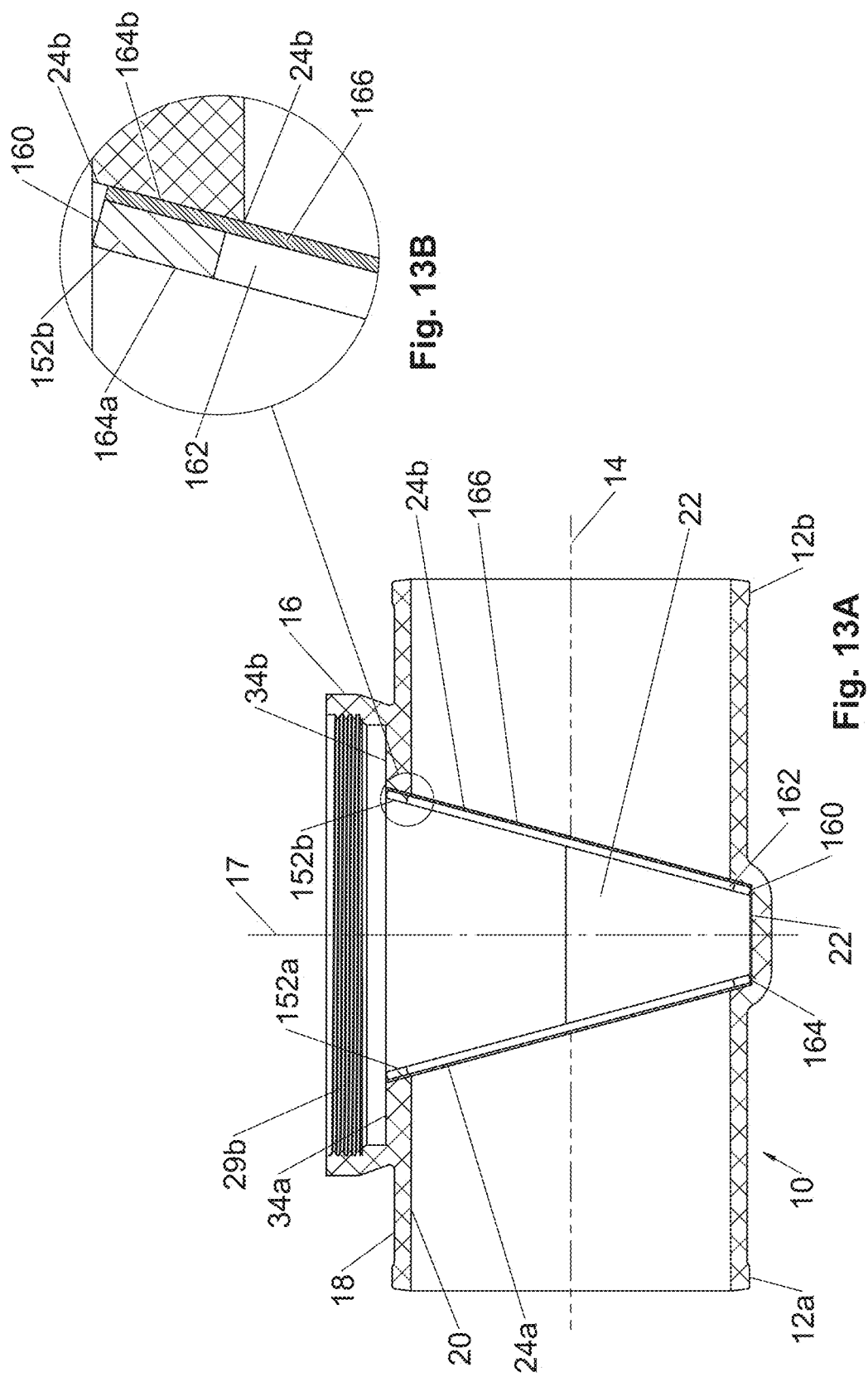

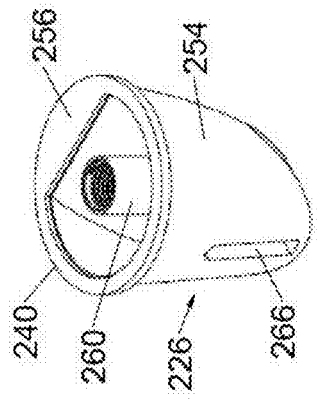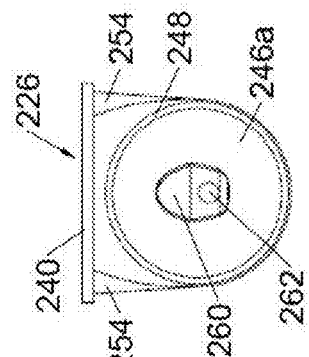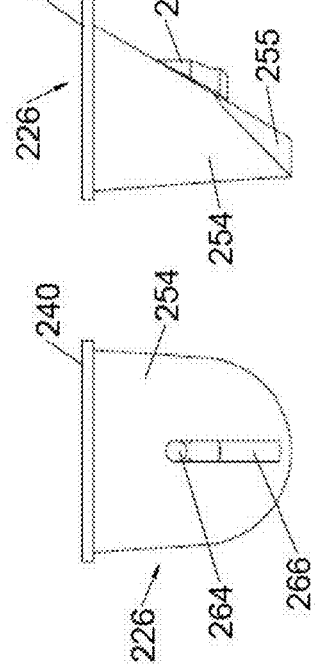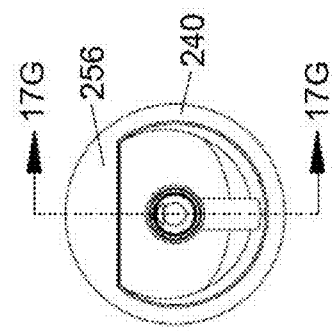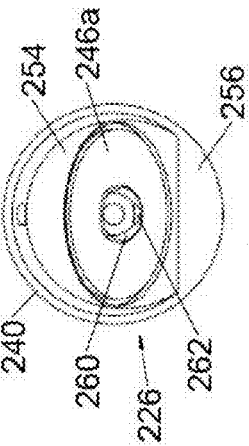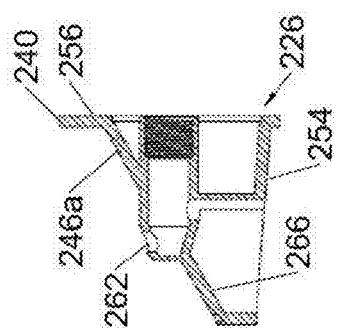

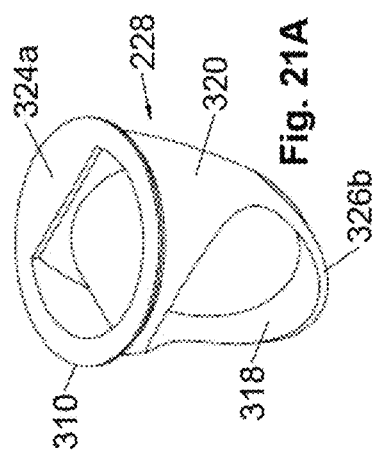
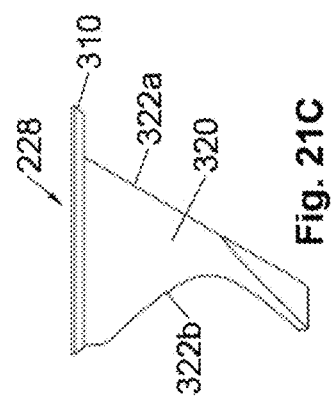
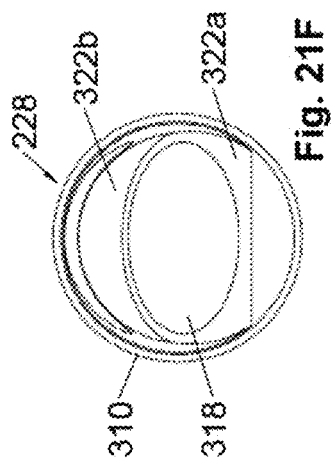
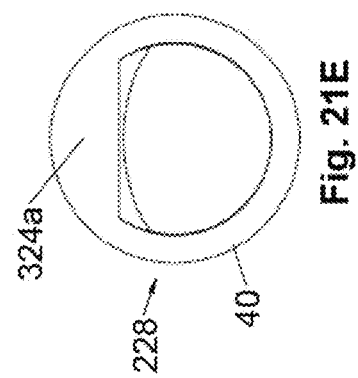
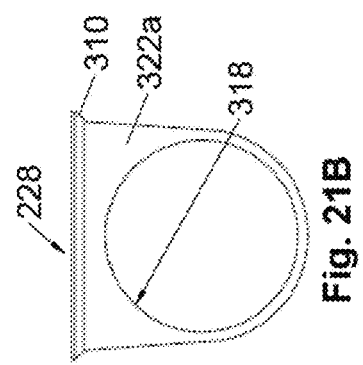
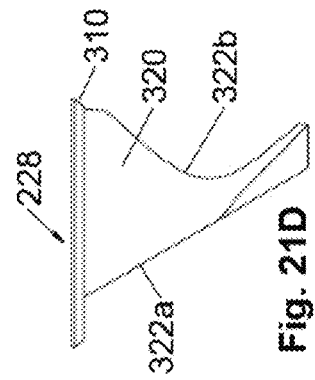

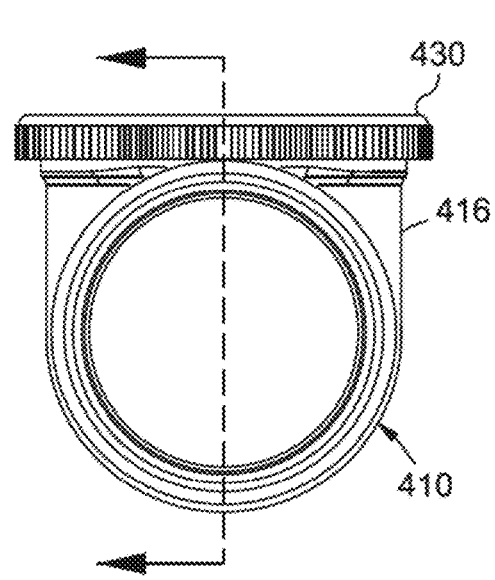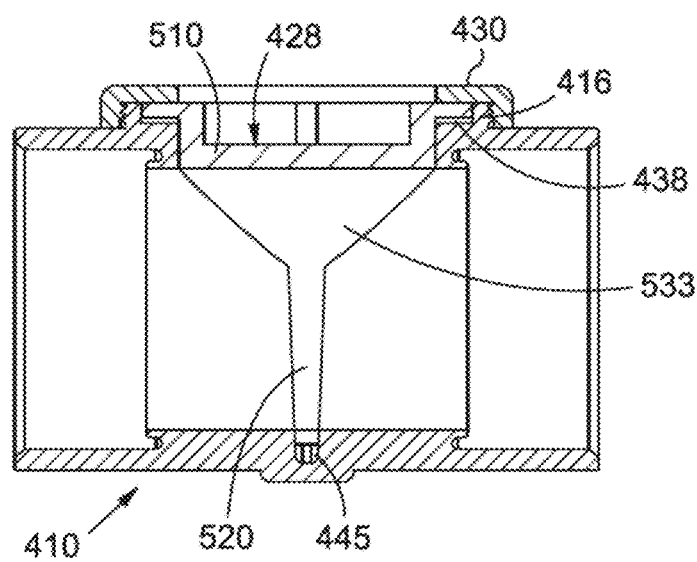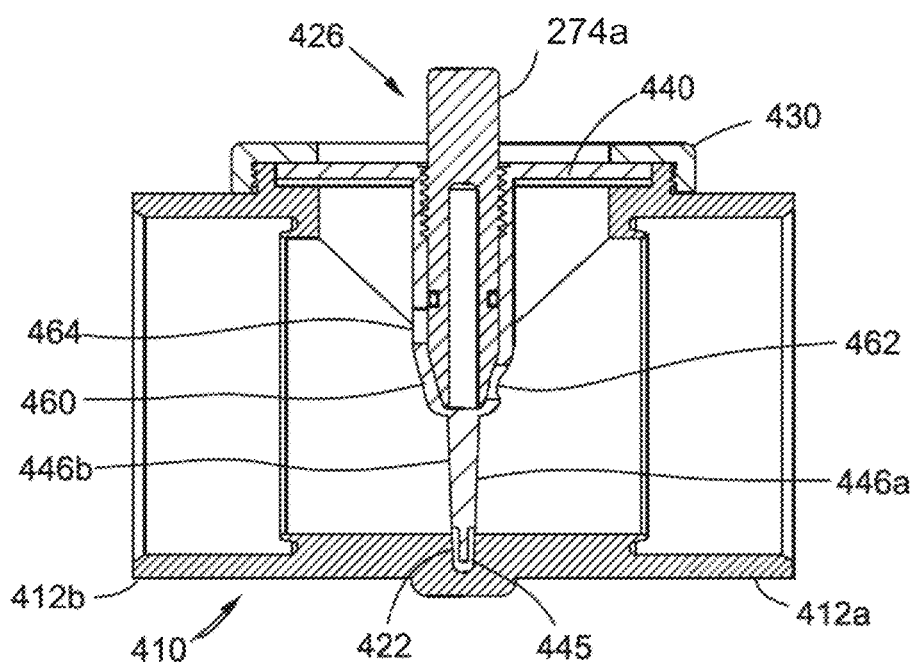

PIPE PRESSURE TESTING METHOD AND APPARATUS

CROSS-REFERENCE TO RELATED APPLICATIONS

This application is a continuation of U.S. patent Ser. No. 15/234,958 filed on Aug. 11, 2016, which is a continuation of U.S. patent Ser. No. 14/517,520 filed on Oct. 17, 2014 and issued as U.S. Pat. No. 9,964,461 on May 8, 2018, which is a divisional of U.S. patent Ser. No. 13/482,557 filed on May 29, 2012 and issued as U.S. Pat. No. 8,887,768 on Nov. 18, 2014, which is a divisional of U.S. patent Ser. No. 12/542,371 filed on Aug. 17, 2009 and issued as U.S. Pat. No. 8,210,029 on Jul. 3, 2012, which claims the benefits of U.S. Provisional Patent Ser. No. 61/089,360 filed on Aug. 15, 2008, the entire of which applications are incorporated herein by reference.

STATEMENT RE: FEDERALLY SPONSORED RESEARCH/DEVELOPMENT

Not Applicable

BACKGROUND OF THE INVENTION

Buildings and houses have pipelines that need to be pressure tested in order to verify that the various joints in the pipeline do not leak. Such lines include water lines and drainage lines. This testing is typically done by hooking up a source of pressurized air or water to the line and filling the line. Because an open line will not hold the pressure for testing, the end(s) of each line or segments of the line must be capped or plugged prior to introducing the pressurized air or water. This is troublesome and there is thus a need for an easier way to block the line for testing.

Further the line must frequently be tested in an intact state, after all joints have been fully assembled. If a single joint or a series of joints are tested, this testing requires plugs to be introduced into the interior of the pipe via temporary openings which must be later closed and sealed. It is desirable to have the ability to pressurize and relieve pressure at the test fitting. But in some cases, it may be desirable to fill at the test fitting and yet not release the test pressure by allowing to fluid flow through the pipe rather than venting at the test fitting. There is thus a need to relieve the test pressure in a controlled manner and in a variety of ways.

During or after the initial pressure testing of pipelines a need often arises to inspect the plumbing line or to test for blockage, typically by running a plumbing snake down the line. A cleanout fitting is often provided to make this inspection and clearing easier. Cleanout fittings combined with pressure-test fittings exist as inflatable bladders are inserted into cleanout fittings for pressure testing. But the inflatable bladders risk breaking or cracking the fitting by over-inflating the sealing bladder. Combinations using removable gate slides or gate valves and/or removable but hollow finish slides are described in several patents, including U.S. Pat. Nos. 7,398,675, 6,699,704, 6,672,139, 6,655,413, 6,422,064, 6,234,007, and D488,852. Most of these provide small openings in the pipe and are thus suited only for pressure testing but do not readily allow other uses, such as pipe cleanout or inspection.

One company makes a gate device that is inserted into a generally V-shaped notch (viewed from the side) in a clean-out fitting is described and show in U.S. Pat. No. 7,325,442. But that design requires a large, complex shaped opening and a large, complex shaped seal that bends at right angles, neither of which are proven to stand the test of time and repeated use. Moreover, the generally V-shaped notch extends to the midline of the pipe fitting and significantly weakens the fitting, causing deformation and leakage when the fitting is deformed by the weight of the adjoining pipeline. As reflected by this patent, it is believed disadvantageous to form a pressure testing fitting in the same opening as a cleanout fitting, in part because many plumbing codes require that the cleanout fitting have an opening that is no smaller than 0.5 inches smaller than the nominal size of the pipe and such a large opening weakens the fitting and pipeline.

There is thus a need for a combined pressure-testing cleanout fitting that is of simple construction and that uses simpler and more reliable seal while providing increased strength to support the weight of adjoining pipelines.

BRIEF SUMMARY

A fitting is provided having a circular port through which is inserted a pressure testing device. The fitting is preferably a T fitting. The pressure testing device is inserted into a recess in the fitting walls which recess extends around the flow path through the fitting. The recess in the fitting walls has a shaped profile that is wider at the top and narrower at the bottom which bottom is opposite the port, with the bottom walls of the recess spaced apart a smaller distance than the walls of the recess adjacent the port. The pressure testing device has a mating profile with opposing faces of the device inclined toward the a longitudinal flow path through the fitting and with the opposing faces being angled in opposing directions at about 15 degrees relative to the axis of insertion, which insertion axis is perpendicular to the longitudinal flow path through the fitting and pipeline. Advantageously, the walls at the top of the fluid passage by the port are spaced apart a distance that is about the nominal size of the pipe to about ½ inch smaller than the nominal size of the pipe, and preferably about ½ inch smaller than the inner diameter of the pipeline.

The pressure testing device has a circular portion that seals against the circular port using currently available seals and preferably using O-ring seals between planar surfaces or between concentric surfaces in order to seal the port. As noted above, the fitting has a recess opening to the port, the recess having two oppositely inclined walls through which the fluid flow path passes through the fitting. The pressure testing device fits into the recess to block flow through the fitting and seals against at least one of the walls using an O-ring that encircles the flow path, preferably on the upstream side of the fitting. An annular rib or another sealing ring on the downstream side abutting the opposing inclined wall urges the upstream O-ring seal into sealing engagement.

The pressure testing device preferably has an externally opening recess into which a dual valve assembly is inserted to block or unblock a flow path through the pressure testing device, which flow path is optionally not straight but which can place the upstream and downstream portions of the pipeline in fluid communication. The dual valve assembly is externally accessible and preferably has a threaded end adapted to fasten to a garden hose. The dual valve assembly is connected to the pressure testing device and optionally provides four fluid flow combinations. Advantageously the first valve moves within a recess in the pressure testing device to block or permit flow along a first fluid path extending between opposing faces of the pressure testing fitting, within the flow path of the fitting. A second valve allows flow along a second fluid path in the pressure testing device, through the first valve, from inside the fluid path to outside the fitting. When the first and second valves are both in a first, closed position, flow through the pressure testing device and fitting are blocked for pressure testing of the pipeline. When the first and second valves are both in a second, open position, flow through the fitting flow path, into the fitting through the valves, and out through the valves are not blocked, for quickly releasing pressure from the pipeline. When the first valve is open and the second valve is closed, flow through the fitting flow path is allowed for releasing pressure only through the pipeline. When the first valve is closed and the second valve is open, flow into or out of the fitting through the valves is allowed, for pressurizing the pipeline through the testing device, for pressure testing. There is thus provided a pressure testing device with four flow combinations to provide multiple drain, fill and flow options in a compact assembly.

The first valve is preferably a tubular stem valve and the second valve is advantageously a rotary valve, preferably a cylindrical rotary valve. The first valve controls flow through a first fluid passage between opposing sides or faces of the testing device. The second valve controls fluid flow along a second flow path through the testing device from inside the fitting to outside the fitting. Advantageously, at least a portion of the first valve can be moved within a recess in the test device to allow flow through the pressure testing device within the fitting, and preferably the first valve rotates as it translates within the testing device between open and closed positions. The rotary valve is preferably on the tubular valve stem, with both valves being manually operable from outside the fitting and outside the pressure testing device, but with the stem valve being seated within the flow path of the fitting.

When the pressure testing device is removed after testing, then a finish device is inserted into the fitting. The sealing device has a shape similar to the pressure testing device but has a ring shaped portion that encircles the flow path through the fitting and fills any recess sufficiently to provide a smooth or substantially continuous flow path through the fitting. The sealing device has a circular portion that seals against the circular port using commonly available seals and preferably using O-ring seals between planar surfaces or between concentric surfaces in order to seal the port. The sealing device mates with the recess in the fitting to provide a smooth flow path.

There is also provided a pipeline pressure testing assembly having a fitting defining a flow path and having a port on a wall of the fitting into which a pressure testing device is removably inserted along a central axis of the port for pressure testing of the pipeline. The port is circular, larger than the interior diameter of the pipeline and located at or slightly above the walls of the tube forming the flow path through the fitting. The fitting has a recess encircling the flow path and opening to the port to receive the testing and sealing devices, or the recess at least partially encircles the flow path depending on how one views the intersection of the opening formed by the port with the flow path through the fitting. The recess is formed by two opposing walls inclined relative to the central axis of the recess so the pressure testing device wedges into the recess to block flow through the fitting like a gate valve. Advantageously, the recess walls at the top of the fluid passage by the port are spaced apart a distance that is about the nominal size of the pipe to about ½ inch smaller than the nominal size of the pipe, and preferably about ½ inch smaller than the inner diameter of the pipeline.

The pressure testing device uses a convenient shape and size for the opening or port in the fitting, such that, in conjunction with the removable parts discussed herein, easy and repeatable access is provided through the port into the interior of the piping system. This access may be used for inspection of the pipe interior or as an entry point for standard tools. A key use for this access is as a pipe cleanout, through which tools such a plumbing "snake" that is about the same size as the inner diameter as the pipeline, may be used to remove debris or blockage from the piping system. Further, it may be used for devices such as inspection cameras, pressure gauges or other measurement devices, to perform other maintenance, or for such other purposes as may be facilitated by the invention.

An additional useful aspect of the invention is that the design of the fitting and associated components allows the invention to be assembled, disassembled and operated completely or substantially without hardware fasteners or additional tools, except as may optionally be required for attaching the fitting to the rest of the piping system, in accordance with the usual techniques of the job.

An additional advantage is that, because it combines both a pressure-test device and a cleanout access in the same fitting, it can potentially reduce the number of fittings required in the piping system. For example, in a building plumbing system, the usual method is to install several "test tee" fittings of the traditional type, plus a smaller number of dedicated "cleanout" fittings. The present invention makes it possible to combine the test and cleanout functions in a single fitting in specific locations as desired and therefore make the separate "cleanout" fittings redundant and unnecessary.

An additional useful aspect of the invention, in comparison with some other devices, is that the shape of the fitting preserves the strength inherent in the closed cylindrical shapes of the pipe interface ends and the test/cleanout access opening. Other existing art uses shapes and forms which, for example, present as wedge-shaped cuts into the cylindrical shape of the pipe fitting as shown in U.S. Pat. No. 7,325,442, and that can induce local weakening and distortion of the fitting and failure of the complex seals not only on the fitting but on adjoining pipelines segments. This can be of particular significance, for example, when using a fitting formed of plastic within a heavy cast iron piping system, where the Fitting must bear some of the weight of the metal pipe.

A further useful aspect of the invention is that it uses a threaded rotational valve for initial pressure relief instead of one which relies on sliding friction and an interference fit. A sliding interference fit can be easily subject to sticking and jamming, and can require high initial forces to activate unless under continuous lubrication, which is not the case with a valve of the present design.

A still further useful aspect of the invention is that, in comparison to the narrow openings and crevices and sliding components of some other devices, it provides for open and easy access to the valve interior and the sealing surfaces. This applies to the fitting surfaces as well as to the components, such as the pressure testing fitting and the removable tubular stem valve. This is important for cleaning and maintenance of the device/invention, which is intended for multiple uses and which is subject to contamination by dirt and debris in the daily work environment.

Yet another useful aspect of the invention is that, in some embodiments, it can employ replaceable seal devices, such as planar O-rings, which are standard and readily available to the end user of the pressure testing devices for easy field repair if required.

There is thus advantageously provided a pressure testing assembly for pipelines having a dual valve assembly. The assembly includes a fitting having walls defining a flow path through the fitting and a port defining a circular opening and located on one side of the fitting. The port opening is large enough for a cleanout device. The fitting has walls defining a recess around the flow path and opening onto the port and the recess is configured to allow the cleanout device to enter the fitting flow path. A test device is configured to fit into the recess and form a fluid tight seal with at least one wall of the recess for pressure testing. The test device has an opening on an upstream and downstream side of the device with the upstream and downstream openings being in fluid communication. A dual valve assembly is located in the test device and has a first and second valve with an end of the valve assembly being externally accessible to operate both valves. The first valve is in fluid communication with the upstream and downstream openings to open and close fluid flow through the upstream and downstream openings. The first valve has a fluid flow path therethrough in fluid communication with the second valve. The second valve has a fluid flow path therethrough having an end located outside the fitting. The second valve opens and closes fluid flow to the end located outside the fitting.

An additional useful aspect of the invention in comparison to some other devices is that the initial pressure relief is very leak proof in that there are no leaks to the exterior of the testing device, allowing the test environment to remain completely dry. This is achieved by seals internal to the tubular stem valve and by the controlled manner of rotary valve activation and the depth of the fluid flow path within the testing device. Similar devices which use inflated balls or sliding valve components, even though they may do a reasonable job of minimizing leakage, are subject to emitting sprays and drips, especially if the interior of the pressure test device has become clogged or dirty, or if insufficient lubrication has been applied.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7A is a perspective view of a fitting with female ends as shown in FIG. 1A;

FIG. 7B is a side view of the fitting of FIG. 7A;

FIG. 7C is a sectional view of the fitting of FIG. 7A taken in the plane formed by axes 14 and 17;

FIG. 7D is a top view of the fitting of FIG. 7A along axes 17, showing the open port or mouth of the port and internal recess;

FIG. 7E is an end view of the fitting of FIG. 7D, with the other end view being a mirror image;

FIG. 7F is a bottom view of the fitting of FIG. 7E;

FIG. 8A is a front perspective view of a retaining ring as shown in FIG. 1A;

FIG. 8B is a back perspective view of the retaining ring shown in FIG. 8A;

FIG. 8C is a side sectional view the retaining ring shown in FIG. 8A;

FIG. 8D is a bottom view the retaining ring shown in FIG. 8A;

FIG. 8E is a side view the retaining ring shown in FIGS. 8A and 8C;

FIG. 9A is a side view of the pressure testing assembly of FIG. 1A;

FIG. 9B is a top view of the pressure testing assembly of FIG. 9A;

FIG. 9C is a bottom view of the pressure testing assembly of FIG. 9A;

FIG. 9D is a right side view of the pressure testing assembly of FIG. 9A;

FIG. 9E is a left side view of the pressure testing assembly of FIG. 9A;

FIG. 12A is a perspective view of the sealing device of FIG. 11;

FIG. 12B is a front view of the sealing device of FIG. 12A;

FIG. 12C is a side view of the sealing device of FIG. 12B;

FIG. 12D is a sectioned perspective view of the sealing device of FIG. 12A;

FIG. 12E is a top plan view of the sealing device of FIG. 12C;

FIG. 13A is a sectional view of a cast iron fitting with inserts;

FIG. 13B is an enlarged sectional view of a portion of FIG. 13A;

FIG. 17A is a perspective view of the one sided pressure testing device shown in FIG. 16A;

FIG. 17B is a front view of the pressure testing device of FIG. 17A;

FIG. 17C is a side view of the pressure testing device of FIG. 17B, with the opposing side view being the mirror image thereof;

FIG. 17D is a back view of the pressure testing device of FIG. 17B;

FIG. 17E is a bottom plan view of the pressure testing device of FIG. 17B;

FIG. 17F is a top plan view of the pressure testing device of FIG. 17B;

FIG. 17G is a section view taken along Section 17G-17G of FIG. 17F;

FIG. 21A is a perspective view of the sealing device of FIG. 16B;

FIG. 21B is a front plan view of the sealing device of FIG. 21A;

FIG. 21C is a right side plan view of the sealing device of FIG. 21B;

FIG. 21D is a left side plan view of the sealing device of FIG. 21B;

FIG. 21E is a top plan view of the sealing device of FIG. 21B;

FIG. 21F is a bottom plan view of the sealing device of FIG. 21B;

FIG. 23 is an end view of the fitting of FIG. 22;

FIG. 24 is a sectional view of the fitting of FIG. 22 along section 24-24, showing a pressure testing device with a two position valve stem;

FIG. 25 is a sectional view of the fitting of FIG. 22 along section 24-24, showing a sealing device of the type shown in FIG. 26.

DETAILED DESCRIPTION

Figure 1C:
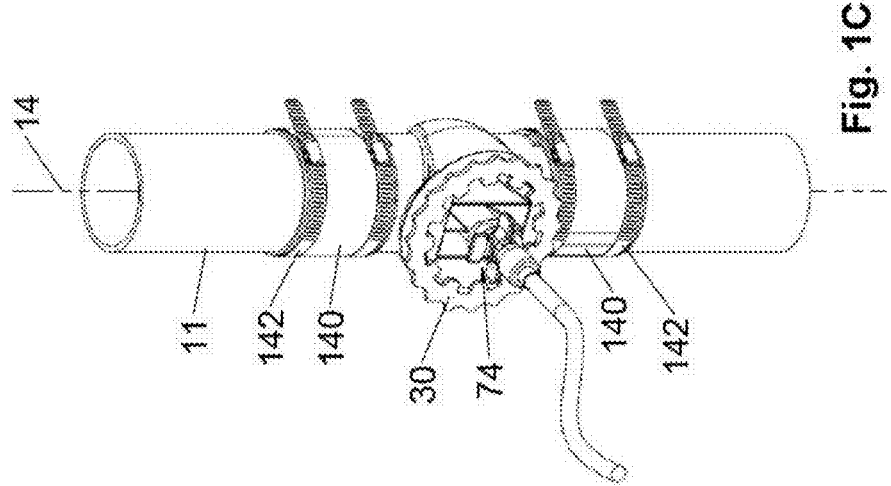
FIG. 1C is a perspective view of the pressure testing device fastened into an alternative cleanout fitting with a fluid tube connected to the testing device.

Referring to FIGS. 1-9, and especially FIGS. 1-4, the plumbing fitting 10 has at least one end, and preferably two opposing ends 12a, 12b, adapted to connect to an end of a pipelines or other conduit for pressure testing the line. The fitting 10 is advantageously made of a polymer, such as ABS or PVC plastic, although other materials could be used, including metal and cast iron. Typically the ends of the pipelines are inserted into mating ends of the fitting as shown in FIGS. 1A and 1B, although the fitting could abut the end(s) of the pipeline with flexible tubular seals clamped over abutting ends of the fitting 10 and pipeline 11 with hose clamps in order to hold the parts in alignment and to ensure the fluid seal as shown in FIG. 1C.

The fitting 10 has a longitudinal axis 14 along which fluid flows. The fitting has as opening or port 16 into which an apparatus is inserted to regulate flow through the fitting. The fitting has exterior walls 18 and interior walls 20. A fitting recess is formed in or by the interior walls 20, with the recess having opposing, inclined fitting walls 24a, 24b that are separated and form a generally U shaped recess (viewed from the side) that is wider at the top at port 16 and narrower at the bottom opposite the port 16, although the opposing walls at the bottom of the recess are spaced apart. The fluid flow path 14 passes through an opening in these fitting walls 24a, 24b. Wall 24a is located on the upstream side of fitting 10 along path 14, and wall 24b is located on the downstream side relative to wall 24a.

The interior fitting walls 18 define a cylindrical flow path along longitudinal axis 14 through at least a portion of the fitting. The port 16 is externally accessible, forming a circular opening around a central axis 17 that extends toward and preferably intersects the longitudinal axis 14. The circular opening of the port 16 advantageously extends along central axis 17 for only a short distance and stops at the location of the outer or exterior tubular walls 18. The circular opening in the port 16 is advantageously larger than is the diameter of the passageway formed by interior walls 18, which advantageously is the same as the inner diameter of the pipeline.

A first part, referred to here as a test plug or test device 26 is removably inserted into the port 16 of the fitting 10 to provide a fluid tight seal with mating recess surfaces 24 of the fitting 10 to allow pressure testing of the drain system upstream of the test device 26. The testing device is held in position by a retaining mechanism. A threaded retaining ring 30 is used in the illustrated embodiments. The ring 30 has threads 29a mating with corresponding threads 29b on the port 16. Preferably the ring 30 has external threads on a flange that mate with internal threads inside port 16. Acme threads or other high strength threads are preferred for threads 29a and 29b. Advantageously the inner and/or outer peripheries of ring 30 are configured for engagement by a user's hands or by wrenches. The outer periphery of ring 30 is depicted with recesses 32a forming hand wrenching surfaces formed by curved surfaces and rounded cusps, spaced to allow a user's fingers to rotate the ring 30. The inner periphery of ring 30 has recesses 32b comprising rectangular recesses configured to engage channel locks or other wrenching tools. Other engaging surfaces could be used, including knurled surfaces or wrenching surfaces. Other gripping or wrenching shapes could be used on the retaining ring, including spokes, cogs, slots, pins, et. cet. to aid in gripping and turning manually or with tools. Retaining mechanisms could be used other than a threaded ring.

After testing is completed, the retaining ring 30 and test device 26 are removed and a second device, referred to here as sealing device 28 (FIGS. 11-12), is then inserted to seal the port 16 of the fitting 10 in order to prevent fluid from escaping the port while allowing to flow through the fitting along the axis 14. The retaining ring 30 maintains the sealing device 26 in place. As noted, the fitting 10 and retaining ring 30 are advantageously made of a polymer, preferably ABS or PVC plastic, although other materials could be used, including metal and cast iron. The retaining ring 30 could be made of metal, and could form a solid disc or cap if desired. The testing and sealing devices 26, 28 may be also be made of ABS OR PVC plastic, but are preferably made of polypropylene or polyethylene which cannot be bonded by typical plastic pipe adhesive so as to avoid inadvertently gluing the devices to the fitting 10.

The fitting 10 preferably comprises a cylindrical tube extending along longitudinal axis 14 with the opening or port 16 opening onto a side of the fitting. The port 16 is has a circular interior portion, but various exterior shapes could be used. The port 16 is advantageously, but optionally formed in a cylindrical part so the fitting 10 generally has two cylindrical tubes intersecting at right angles. The depicted embodiment is a T fitting, but the port 16 can be located on an elbow fitting, a dead end fitting, an angle fitting, or other pipe joints.

The fitting 10 has a fitting recess 22 extending around the inner circumference of the flow path through the fitting 10 and opening into the port 16, although depending on how one views the intersection of the port and flow path through the fitting, the fitting recess 22 could be viewed as encircling only a portion of the flow path. Preferably, though, it is viewed as encircling the flow path and extending around the entire circumference of the flow path. The fitting recess is configured and located to receive the devices 26, 28, and the testing device 26 preferably forms a fluid tight seal with the fitting recess while the sealing device 28 preferably forms a substantially continuous surface to provide a smooth flow passage through the fitting 10. Since the fitting recess opens into the port 16 the shape of the fitting recess will typically blend together or overlap with part of the port 16.

The fitting walls 24 are flat, having a generally V-shape or horseshoe shape with an elliptical opening through which the flow path 14 passes. The shape of the elliptical opening varies with the inclination of the fitting walls 24 relative to the flow path 14. The inclined fitting walls 24 are flat to form a sealing surface with the devices 26, 28 as discussed later, and there is enough space between the opening for the fluid passage and the walls of the fitting for a seal as described later.

The fitting walls 24a, 24b at the top of the recess 22 by port 16 are spaced apart a distance that is at least large enough to allow passage of a ball or sphere that is about ½ inch smaller than the nominal diameter of the pipeline to which the fitting 10 is connected. The diameter of the interior walls 20 adjacent the port 16 preferably have the same interior diameter as that of the pipeline. A spacing as large as the nominal pipe diameter or as large as the diameter of interior walls 20 could be used. The walls at the bottom of the fitting recess, opposite the port 16, are spaced apart a distance sufficient to allow the described ball to enter and pass through the flow path through the fitting and enter the pipeline. Once the dimension to accommodate passage of the described ball is accommodated, the inclination of fitting walls 24a, 24b can be varied to accommodate varying degrees of wedging with the mating walls of the devices 26, 28, making it more easy or difficult to insert and remove those devices because of friction and wedging. Fitting walls 24 inclined at an angle of about 15 degrees to a plane orthogonal to the longitudinal axis 14 during use, are believed suitable.

The port 16 is larger than the pipe diameter so the tops of the walls 24 at the circular port 16 form chords across the circular port. The tops of the walls 24 form opposing flats 34a, 34b having a curved side bounded by the port 16 and a flat side bounded by the inclined fitting walls 24a, 24b.

Around the periphery of the flats 34 is a flat shoulder or ledge 36 that is slightly offset outward from axis 14 and flats 34. The shoulder 34 forms a sealing surface for a sealing ring 38, such and O-ring or D-ring that is urged against the shoulder 34 by retaining ring 30 to seal the port 16. Typically, a lip or flange on one of the devices 26, 28 is interposed between the retaining ring 30 and the sealing ring 38 as discussed later.

The inclined fitting walls 24 form a fitting recess that is larger at the location where the test device 26 is inserted at port 16 and is smaller at the side of the fitting 10 opposite the port 16. The sides of the test device 26 and sealing device 28 that face the flow path through the fitting 10 are preferably straight, and preferably slightly tapered to form a wedge fit with the fitting recess in the fitting. Such devices 26, 28 would thus have two opposing flat sides in the flow channel through the fitting which flat sides are joined by two opposing curved or flat sides. But the devices 26, 28 could be circular in cross-section (FIGS. 15A, 16, 17, 19A, 19B) and thus have a conical shape with a curved surface in the flow path through the fitting 10 and a curved surface in the fitting recess. In other variations the testing device 26 and to a lesser extent the sealing device 28 are paddle shaped with more parallel walls in the flow channel or at least the bottom half of the flow channel, as in FIGS. 22-26.

The use of a cylindrical port 16 as shown and described herein allows simpler seals and parts to be used. Preferably a ring seal 38 (e.g., O-ring, D-ring) can be used and is clamped between a planar surface on the fitting and a mating surface on the test device 26 or sealing device 28, and is advantageously held in sealing compression by retaining ring 30. The test device 26 is preferably a sliding type\ of valves, such as gate valves Main fitting 10 is provided for insertion into a pipeline, such as the water line of a house or building, or a sewage drain system, so as to allow fluid to flow through the fitting 10 and the line. The fitting 10 is shown as a straight fitting with a longitudinal axis 14 therethrough along the center of the flow path through the fitting, but the fitting could be of various shapes and types, including a Y-fitting, an elbow fitting, a reducing fitting, a narrowing fitting or an enlarging fitting. The opening or port 16 is advantageously sized to act as a cleanout port or fitting.

The fitting 10 has opening or port 16 configured to sealingly receive testing device 26. The port 16 can have various shapes, but is shown with a circular opening or port 16 that extends through a wall 18 of the main fitting 10. The wall 18 has an exterior side 18 and an interior side 20 that are generally parallel and typically form a tube. The port 16 can be at various locations and orientations on the fitting 10, but is described here and shown in FIGS. 1-2 as being located on the top side of the fitting and perpendicular or orthogonal to the longitudinal flow axis 14 through the fitting 10. The top refers to the upward direction that is away from the ground and opposing gravity while the bottom or downward direction refers to a direction toward the ground and along the direction of gravity.

The fitting recess is preferably formed partially in the interior wall 20 or formed by the interior wall 20 of the fitting 10, or it could be formed in a raised area or boss (not shown) inside the fitting. The fitting recess can have various shapes that mate with shape of the devices 26, 28. Because the recess receives the devices 26, 28 that are tapered so they wedge into the fitting recess, the recess is correspondingly shaped relative to the devices 26, 28. Looking into the mouth of the port 16, the fitting recess adjacent the port has curved walls conforming to the circular opening of the port 16. Toward the bottom of the fitting recess opposite the port 16, the recess narrows to a generally rectangular or trapezoidal cross-sectional shape, with the walls along the flow-path being inclined. The fitting recess thus forms a groove (typically of non-constant cross-sectional shape) in the inside walls of the fitting 10 extending away from or outward of the longitudinal axis 14, and opening toward the axis 14. Viewed along the flow path 14, the fitting recess has a general U shape or horseshoe shape. The fitting recess can be centered about centerline 14, but is preferably offset slightly in a direction away from port 16 so that it extends slightly further into the wall 18 opposite the port in order to form a crescent shaped debris trap opposite the port 16 to allow debris to collect in that portion of the recess.

Referring to FIGS. 1-9, the test device 26 has a circular top 40 with an exterior side 42a and interior side 42b. Optionally, there is an orientation indicator 43 (FIG. 2) on the exterior surface 42a located on the side of the device 26 that is to face upstream along path or axis 14. A notch, arrow, projection or label may be used for indicator 43. Preferably there is a stepped circular flange forming a shoulder 44 on the interior side 42b. The sealing ring 38 is placed in this notch or shoulder 44 to form a planar sealing surface.

The testing device 26 has a tapered body depending from the top 40, with two opposing, inclined, flat faces 46a, 46b with face 46a facing upstream during use and face 46b facing downstream during use relative to flow path 14. The faces 46a, 46b are inclined at about 15 degrees relative to a center axis orthogonal to top 40. Viewed along axis 14, the faces 46 have a generally U shape or horseshoe shape. The top of the faces 46a form a chord with the inward facing or interior surface 42b of the top 40. Optionally, the upstream face 46a is marked with visible indicia 47 sufficient to readily notify the user which face of the testing device 26 is the pressure or upstream side. In the depicted embodiment the upstream side 46a has the words "pressure side" printed on, or more preferably molded into, upstream face 46a.

Advantageously, but optionally, a groove (not labeled) in the upstream face 46a receives a sealing ring 48, such as an O-ring or D-ring or other sealing ring. The sealing ring 48 is located to encircle the flow path through the fitting 10 and seal against the mating wall 24a of the fitting recess. Sealing ring 48 and wall 24a provide a face seal encircling the flow path through the fitting 10. The sealing ring 48 is advantageously a discrete part, but it could be formed integrally with upstream face 46a. Further, a plurality of concentrically located sealing rings 48 could be used, depending on the amount of sealing surface available between fitting walls 24 and face(s) 46a, 46b.

A circular rib 50 (FIG. 3) on downstream face 46b is located opposite the groove and sealing ring 48 to abut downstream wall 24b during use. The rib 50 is preferably circular and of a diameter like that of sealing ring 48 but located on an oppositely inclined face 46. The rib 50 is sized to about adjacent wall 24b to urge the sealing ring 48 against the wall 24a to provide a fluid tight lead. A rib 50 that is 20-30 thousandths of an inch high is believed sufficient. The rib 50 is preferably formed integrally with the device 26, as by simultaneously casting of plastic. The rib 50 is preferably continuous, but could be intermittent, and could take the form of a ridge, shelf or bump on the downstream face 46b. In place of rib 50, other displacement devices could be used, including forming a groove (not shown) in the downstream face 46b and placing a sealing ring or displacement ring into that groove to provide the desired sealing force of the ring seal 48 against the wall 24b of fitting recess. Whatever mechanism is selected, sufficient sealing force is applied to maintain seal 48 against the wall 24b during pressure testing to keep leaks to an acceptable level, and preferably to block all leakage past seal 48.

Figure 2:
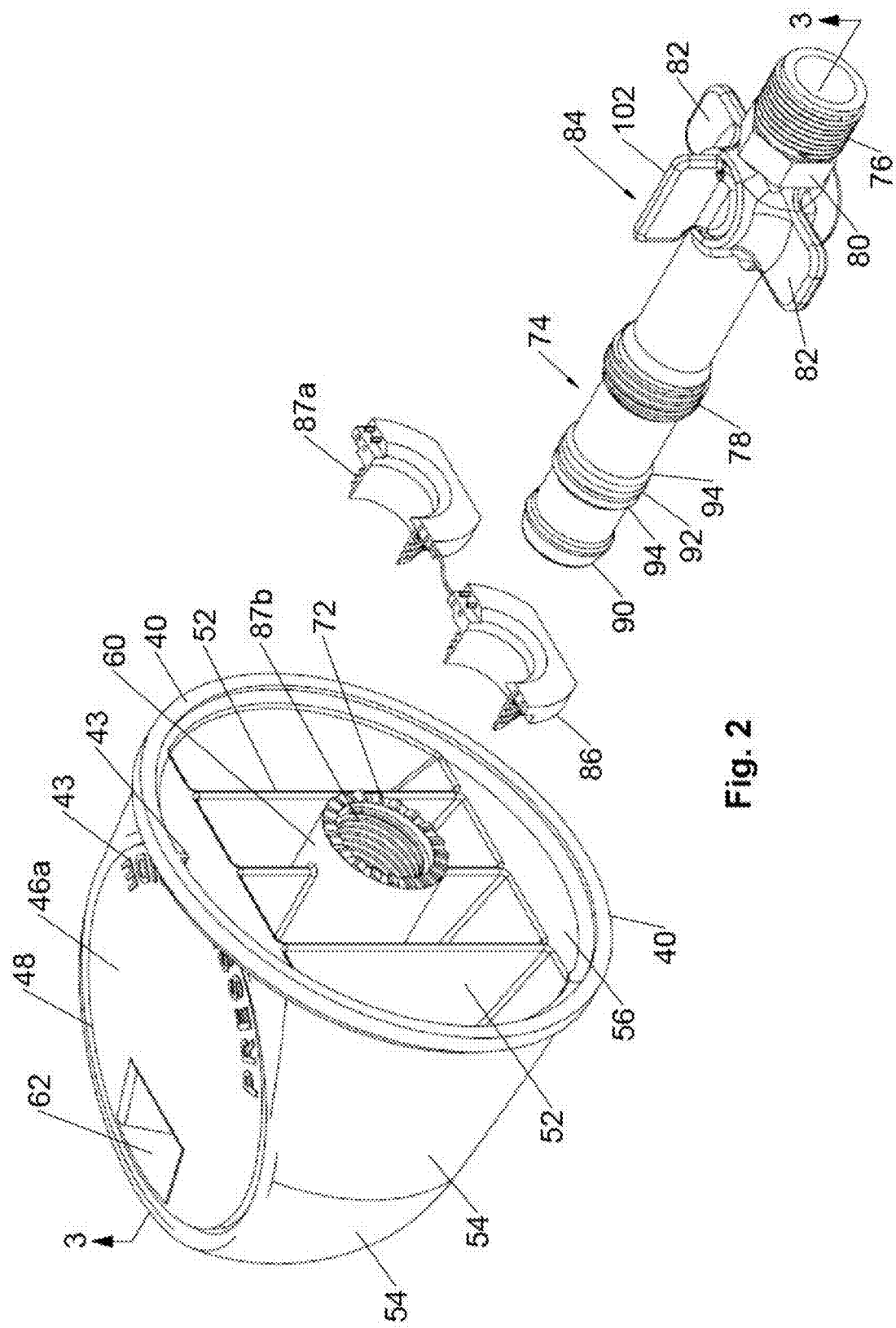
FIG. 2 is an exploded perspective view of the pressure testing device and dual valve assembly.

Referring to FIG. 2, oppositely inclined faces 46 are held apart by sidewalls and strengthened by one or more plates 52. The plates 52 preferably extend between interior surfaces of the faces 46a, 46b. Three plates 52 are shown aligned with the flow path along axis 14 during use, but other orientations or combinations of orientations can be used. A sidewall 54 joins the periphery of the faces 46a, 46b to form an enclosed wedge shape. At the distal end of the testing device 54 (opposite the port 16) the sidewall 54 may be thought of as an end or end wall. Flat portions 56 join the top of each face 46a, 46b to the adjacent circular top 40. The flat portions 56 each have a circular edge formed by top 40 and a straight portion formed by faces 46a or 46b. The flat portions 56 can be considered part of the top 40. The sidewall 54 is preferably curved, but could have other shapes, including a flat surface parallel to the longitudinal axis 14. The radius of curvature of sidewall 54 advantageously matches the curvature of the circular top 40 or is concentric therewith. Whatever external shape the device body 26 takes, the mating walls of the fitting 10 and fitting recess and recess fitting walls 24 are preferably configured to conform to that same shape so that the testing device 26 can wedge into the fitting recess to form a fluid tight seal and block flow through the fitting 10. It is believed possible, but not preferable, to have the wedging of the testing device 26 between inclined fitting walls 24 and faces 46 be sufficient to provide a fluid tight seal and flow blockage sufficient for testing, without using the ring seal 48 and/or without using the wedging of the device 26 in fitting recess 22. The wedging of the device 26 in the fitting recess helps resist removal and may cooperate with the fitting walls 24 and faces 48 to provide a fluid tight seal without the need for sealing ring 48, but that is also less desirable than using the sealing ring.

A tube 60 is formed in the testing device 26 extending down the center of the device in a plane that is preferably orthogonal to the axis 14 during use. The tube 60 ends before the bottom of the testing device 26. As used herein, the top of the testing device 26 refers to a direction toward top 40, and the bottom refers to the opposite direction toward the narrower portion that is inserted the furthest into fitting 10 during use. An opening 62 is formed in the upstream face 46a and opens into the tube 60 and a downstream opening 64 is formed in the downstream face 46b and also opens into the tube 60. The downstream opening 64 is preferably (but optionally) below or further away from top 40 than is the upstream opening 62. The openings 60, 62 are both within the sealing ring 48 and within the fluid flow path through the fitting 10 during use. Advantageously the openings 60, 62 are each recesses in the respective faces 46a, 46b.

Figure 4A:
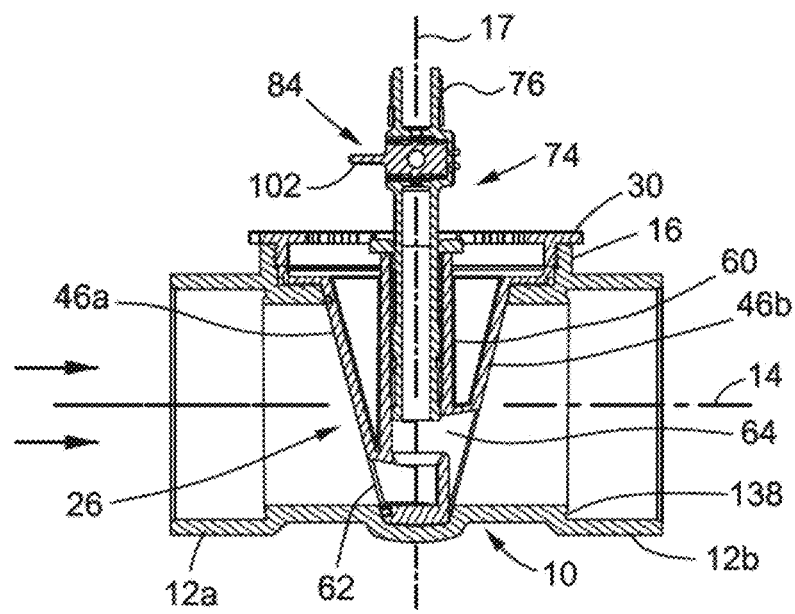
FIG. 4A is a sectional view showing the dual valve allowing flow through the fitting and through the testing device within the fitting.
Figure 4B:
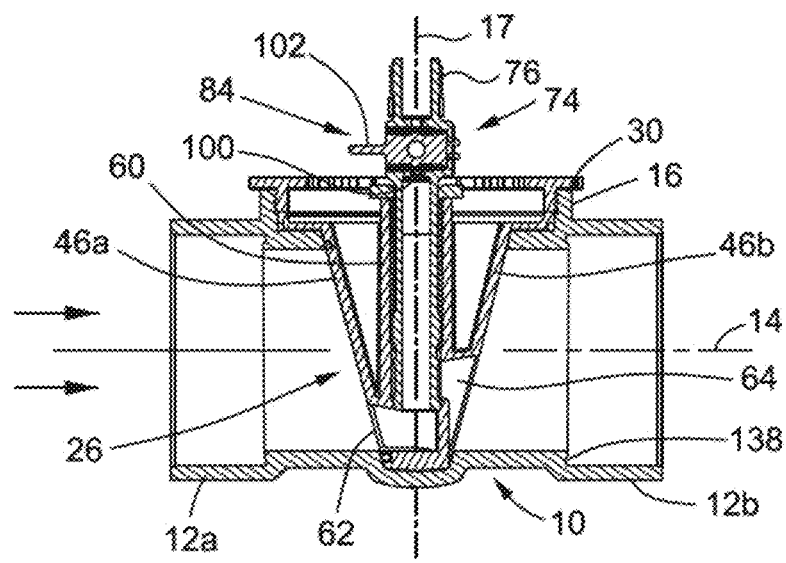
FIG. 4B is a sectional view showing the dual valve blocking flow through the fitting and testing device.
Figure 4C:
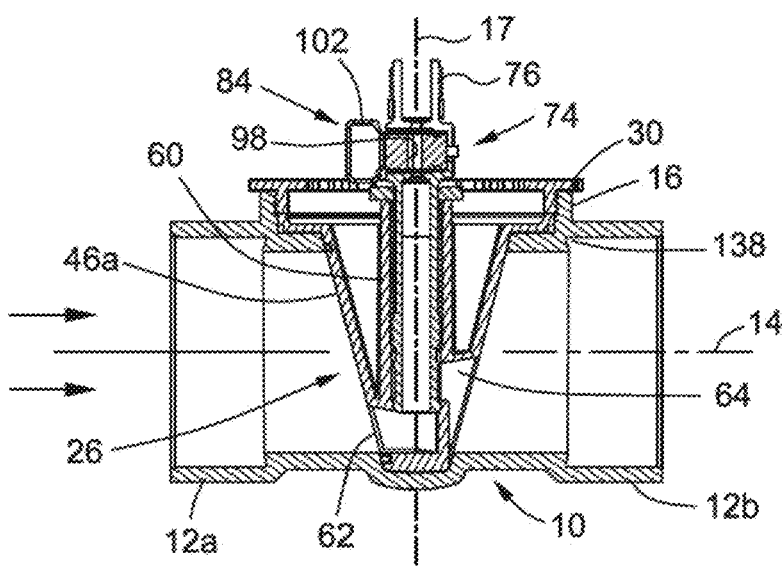
FIG. 4C is a sectional view showing the dual valve allowing flow through the fitting and testing device both inside the fitting and to the outside of the fitting.

The upstream opening 60 preferably takes the general form of box shape that is open on the upstream side with the bottom of the tube 60 opening onto the top wall 66 of the upstream recess through a first conical valve seat 68 formed in part of the top wall 66. The downstream opening 64 is also advantageously a general box shape and is shown being located above the upstream recess 62 with the bottom of the recess 62 containing the valve seat 68. The top wall 66 of upstream recess 62 is thus part of the bottom wall of downstream recess 64. The recesses 62, 64 form a roughly Z shaped or offset flow path through the testing device 26 as shown in FIGS. 4A-4C. Advantageously, the walls forming the recesses or openings 62, 64 are slightly funnel shaped and wider at the faces 46a, 46b and narrower toward the valve seat 68. The walls defining the openings 62, 64 and valve seat 68 are preferably sized and configured so that a cigarette butt can pass through the openings and valve seat under a pressure of about 5 psi. Most cigarette butts are about 1.3 inches long by about 3 inches in diameter, or slightly smaller. Recess walls defining an upstream opening 62 that is about 1.3 inches wide and 0.9 inches high a the upstream face 46a, with a valve seat 68 about 0.9 inches diameter, and a downstream opening 64 that is about 0.6 inches high and over 1 inch wide at the downstream face 46b, are believed suitable.

Referring to FIGS. 4A-4C, the downstream recess 64 is preferably located above the recess 62 relative to the port 16 (port 16 being in the up direction). This orientation allows more fluid to drain if the pipe 11 is in the horizontal orientation.

A portion of the downstream recess 64 extends to the distal end of the testing device 26 with the innermost wall being curved to form a portion of valve seat 68, and the opposing side of that curved wall forming the back wall of the upstream recess 62 but curved in the opposite direction. But that curved interior back wall may not extend to the downstream face 46b, so that the recessed walls forming downstream opening 64 extend to the distal end and into the end or sidewall 54. If so, the recessed walls forming downstream opening 64 interrupts the rib 50 and prevents it from being completely circular in shape. A raised surface such as a curved flange may be formed to allow an uninterrupted and continuous rib 50 to encircle the entire periphery of the downstream face 46b. Since the rib 50 helps urge seal ring 48 against walls 24a, the size of the rib 50 may need to be increased to maintain the sealing pressure if the recess forming opening 64 extends through the rib 50.

Referring to FIGS. 2 and 4, the inside of tube 60 has interior threads 70. The tube 60 is aligned to be concentric with valve seat 68, or vice versa. The tube 60 has an exterior end that is preferably edged with inclined ratchet teeth 72. The valve seat 68 is in fluid communication with both upstream and downstream openings 62, 64 depending on the position of the valve stem 74 and valve member 90. The inner wall of tube 60 can form part of the back wall of the recess defining the upper, downstream facing opening 64.

Figure 5:
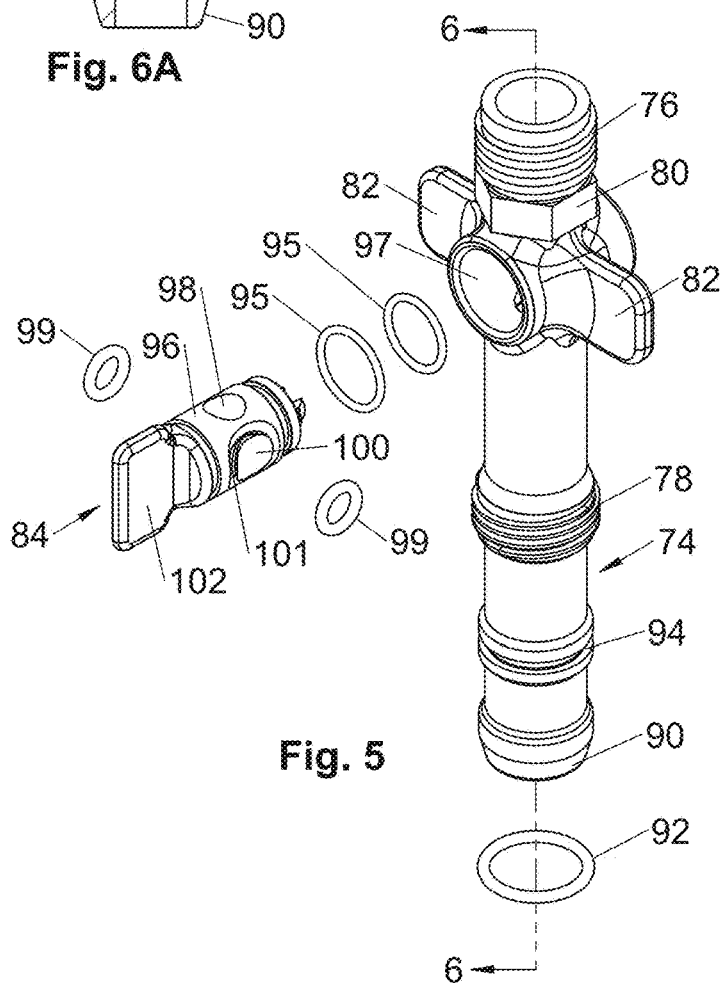
FIG. 5 is an exploded perspective view of the dual valve stem assembly.

A tubular stem valve 74 is provided to selectively open and close fluid flow through recesses 62 and/or 64. Referring to FIGS. 4-6, the tubular stem valve 74 is shown as an elongated tube having a central fluid flow path, with external bib fitting threads 76 on an external end so a hose bib can be fastened to the tubular stem valve 74. The tubular valve stem has intermediate external threads 78 located to threadingly engage interior threads 70 on the tube 60. Single lead, ACME threads are preferred, but other thread types and leads may be used depending on the holding strength and rate of valve opening and closing desired. A wrenching surface 80 and opposing, manually grippable tabs 82 are located on an external end of the tubular stem valve 74, so the tubular valve stem body can be rotated manually. The grippable tabs 82 could be located on the tube 60 or other portions of the test device 26 and could take other shapes configured to be manually gripped or engaged by tools to insert and remove the testing device 26 into or from the fitting 10. A second valve, advantageously a rotary valve and preferably a cylindrical, rotary valve 84 is on the externally accessible portion of the tubular stem valve 74, and is shown as located in the same plane as the tabs 82, but offset 90 degrees. Advantageously the valve 84 fits into the body of tubular stem valve 74. Valve types other than the depicted rotary valve 84 can be used, including a gate valve, ball valve, etc. The rotary valve 84 is described in more detail later.

Rotating the rotary valve 84 a quarter turn blocks or unblocks flow through the tubular stem valve 74 to allow fluid to flow through the valve 84. A retaining ring or collar 86 is located adjacent the tabs 82 to limit the axial movement of the tubular valve stem 74 into the testing device 26 and to prevent removal of the valve 86 from the testing device 26. The collar 86 can be a flange fastened to or molded with the valve stem 74, but is preferably a segmented part selectively fastened along the length of the valve stem 74. The collar 86 preferably has ratchet teeth 88 located and configured to mate with teeth 72 on tube 60 to selectively fix the position of the collar 86 and valve 74 relative to the tube 60. The collar 86 has a hole through which the tubular stem valve 74 extends and the size of that hole is smaller than a distal end of the tubular stem valve 74 so the tubular stem valve 74 cannot pass through the collar 86. The collar 86 advantageously has an externally threaded segment 87a (FIG. 2) that mates with internal threads 87b inside the end of tube 60 to hold the collar in position relative to the tube 60 and testing device 26.

The tubular stem valve 74 has a first conical valve member 90 on its distal end which valve member 90 is configured to sealingly mate with conical valve seat 68. One or more seals 92, such as O-ring or D-ring seals encircle the tubular stem valve 74 and are configured to seal against the inside of tube 60 to restrict fluid flow along the length of the tubular body of valve 84. Advantageously, but optionally, a seal 92 is located adjacent valve end 90. The valve stem 74 advantageously has a larger diameter ring portion 94 located to be above the downstream recess 64 when the valve end 90 is seated in the valve seat 68, in order to restrict fluid flow between the inside of tube 60 and valve stem 74 above the downstream recess 64. The raised portion 94 fits close to the inside of the tube 90 at the top of the downstream recess 64 to restrict fluid flow through the tube 60 toward the outside of the fitting. The raised portion 94 is preferably adjacent ring seal 92, and advantageously comprises a pair of raised annular flanges or shoulders encircling the outer periphery of tube 74, located on opposing sides of ring seal 92 to form a recess into which the sealing ring 92 fits in order to help position or stabilize the seal 92.

Referring to FIGS. 1-4, in use the testing device 26 is inserted into fitting recess in fitting 10 which is fastened to a pipeline. Retaining ring 30 screws onto fitting 10 to squeeze sealing ring 38 between the respective shoulders 36, 44 on the retaining ring and fitting, respectively. Retaining ring 30 allows adjustable tightening to stop leakage. Flats 56 on the testing device abut the corresponding flats 34 in the fitting in order to limit the insertion of the testing device into the fitting 10, but this is optional.

A water hose bib (or air connection) can be connected to threads 76 to provide water (or air) for pressure testing the pipeline, or alternatively to guide off drain water (or air) after testing is stopped. The tubular stem valve 74 can be rotated by tabs 82 or wrenching surface 80, with threads 70, 78 engaging to advance the valve member or valve end 90 along the length of the tubular stem valve 74 against and into sealing engagement with valve seat 68 to open or close a first fluid flow path through recesses 62, 64 and valve seat 68 which place the upstream and downstream sides of the fitting in fluid communication when the testing device 26 is in position. The rotary valve 84 can be rotated to open or close a second fluid flow path through the tubular stem valve 74 which places the flow path through the fitting 10 in fluid communication with the outside of the fitting, and vice versa.

The dual valves 74, 84 provide four flow combinations, three of which are shown in FIGS. 4A to 4C. The first tubular valve 74 moves within a recess 60 in the pressure testing device 26 to block or permit flow along a first fluid path extending between opposing faces 46a, 46b of the pressure testing device, located within the flow path of the fitting 10. The first fluid flow path is through recess 62, valve seat 70 and recess 64, or vice versa depending on flow and pressure conditions. The second valve, rotary valve 84, allows flow along a second fluid path through the tubular stem valve 74, from inside the fluid flow path to outside the fitting 10, or vice versa depending on the flow and pressure conditions. When the first and second valves 74, 84 are both closed as shown in FIG. 4B, flow through the pressure testing device 26 and fitting 10 are blocked for pressure testing of the pipeline. When the first and second valves 74, 84 are both open as shown in FIG. 4C, flow through the fitting flow path along axis 14, into the fitting 10, through the valves 74, 84, and out through the valves 74, 84 are not blocked, and allows one to more quickly release pressure from the pipeline or to drain the pipeline without removing the testing device 26. When the first valve 74 is open and the second valve 84 is closed as shown in FIG. 4A, flow through the fitting flow path along axis 14 is allowed and that releases pressure and drains fluid only through the pipeline. When the first valve 74 is closed (FIG. 4B) and the second valve 84 is open (FIG. 4C), flow into or out of the fitting 10 through both of the valves 74, 84 is allowed, and that can pressurize the pipeline through the testing device 26 for pressure testing, or it can release pressure to the outside of the fitting 10. There is thus provided a pressure testing device with four flow combinations to provide multiple drain, fill and flow options in a compact assembly.

With the tubular stem valve 74 in that first closed position and with the second rotary valve 84 in a first, closed position, the seal 92, valve end 90 and valve seat 68 prevent fluid from passing through upstream recess 62 if the rotary 84 is in a first, closed position. If the rotary valve 84 is in a second, open position, then fluid can pass from the external end of the tubular stem valve 74 into the upstream recess 62 and the upstream portion of the fitting and pipeline.

The tubular valve stem 74 can be rotated by threads 78 away from a closed position where the valve member 90 seals against the valve seat 70 so that fluid flows through the upstream recess 62, into the tube 60 along the tubular stem valve 74 and out the downstream recess 64. The further the valve stem 74 is retracted toward the downstream recess 64 the more open the first fluid flow passage through recesses 62, 64 and valve seat 70 will be. By putting the rotary valve 84 in its first, closed position all fluid flow will be through the upstream and downstream recesses 62, 64 as the rotary 84 and seal 90 block flow through the tube 60 and valve stem 74. Gradual release of testing pressure is achieved by rotating the valve stem 74 and unseating the mating end 90 from seat 68 and unblocking the downstream recess 64. Faster release can be achieved by rotating rotary 84 so fluid flows out of the valve stem 74.

After pressure testing is completed, the testing device 26 is removed by removing retaining ring 30. The handles 82 and valve stem 74 provide a manually grippable handle to pull out the testing device 26 which is wedged into the fitting recess.

The recesses 62, 64, and the opening formed by valve seat 68 which places the recesses in fluid communication, are preferably large enough to allow rapid fluid release when the tubular stem valve 74 is opened, and are also preferably large enough to minimize trapping of debris which may accumulate during assembly, test, or use.

Figure 10:
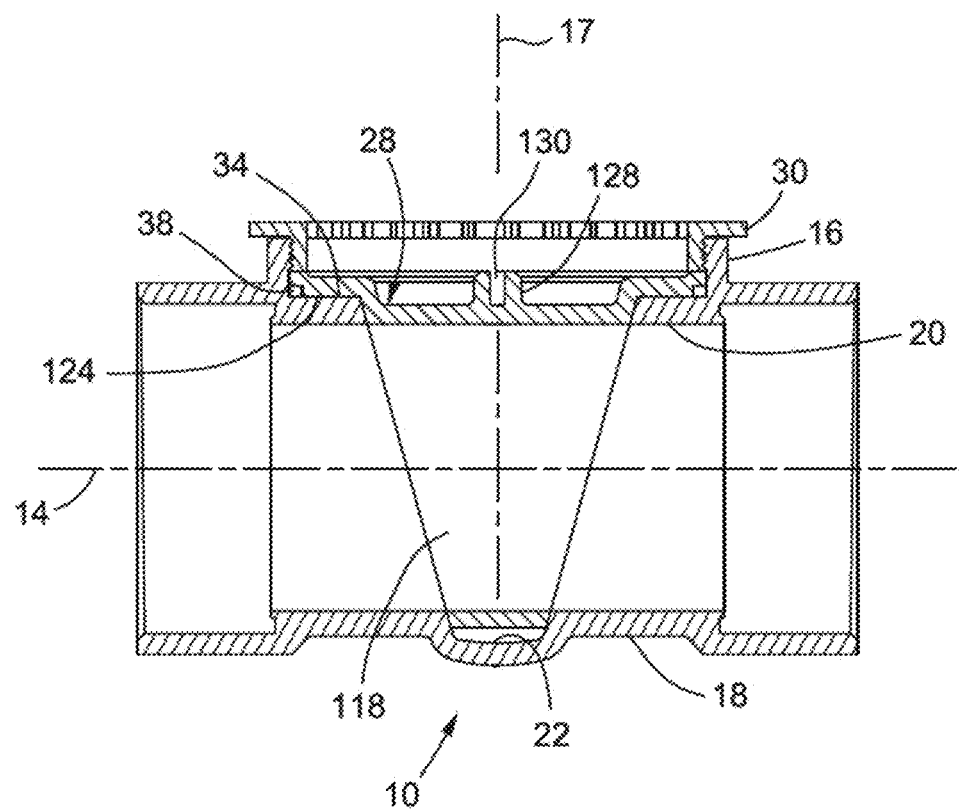
FIG. 10 is a side sectional view of a fitting with a sealing device in place.
Figure 11:
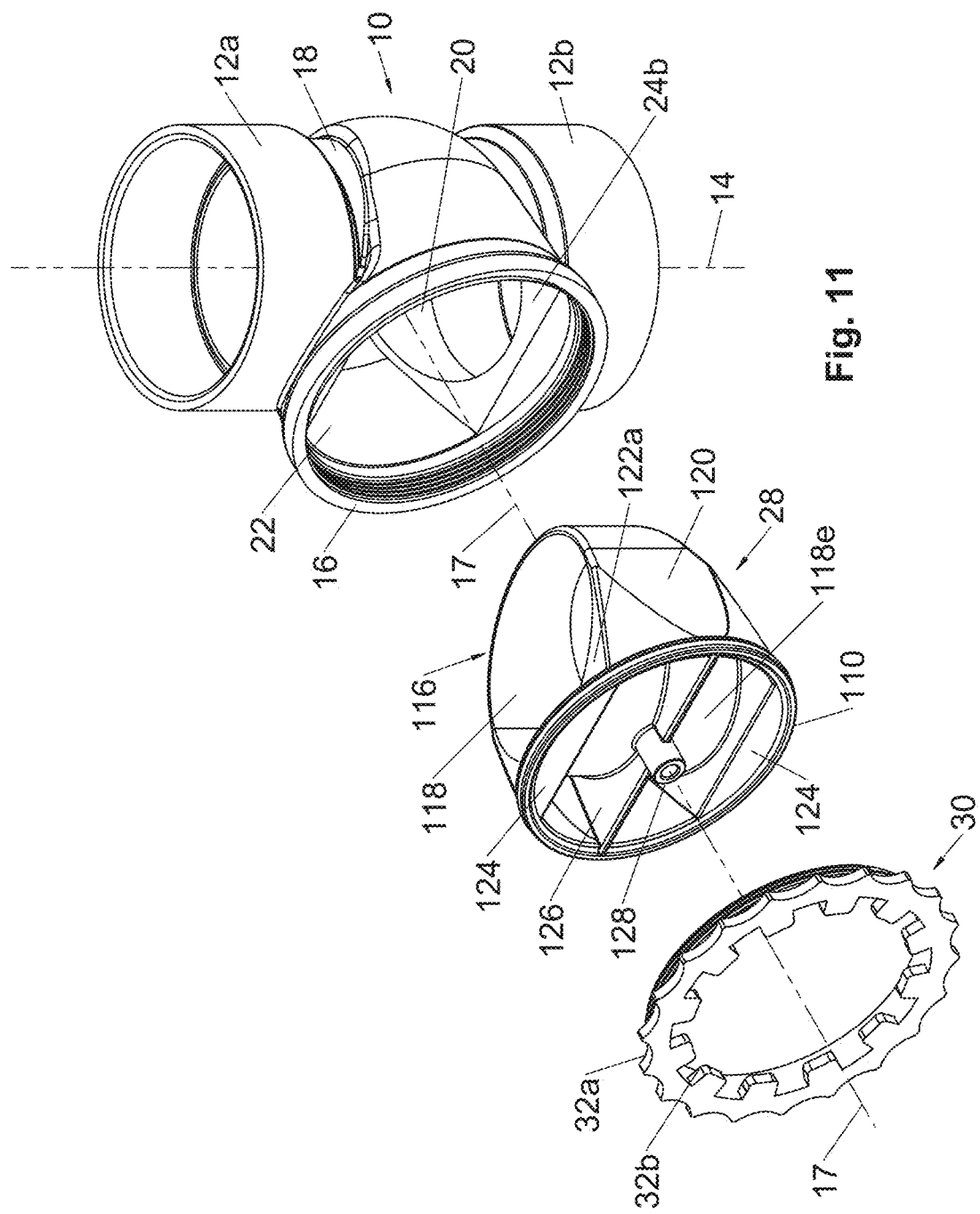
FIG. 11 is an exploded perspective view showing a sealing device retaining ring and fitting.

Referring to FIGS. 10-12, the sealing device 28 is then inserted into the fitting recess and retaining ring 30 fastened to seal the device 28 to the fitting. The sealing device 28 covers the entire opening formed by port 16 to block flow out of the port, and it has a part filling the recess 22 in the fitting 10. Advantageously the sealing device has an annular ring 110 sized to fit inside and close to the walls defining the circular opening of port 16. The retaining ring 30 fastens to the fitting 10 or port 16 to hold the sealing device 28 in position. The ring 110 may have a reduced diameter portion forming a shoulder located to engage ring seal 38 on the port 16. FIG. 12 shows the ring 38 abutting the lower or bottom side of the ring 110 and abutting that shoulder. A hollow body portion 116 depends from the ring 110.

The body portion 116 (FIG. 12) has a cylindrical recess formed by interior walls 118, with the diameter selected to correspond to the diameter of the adjacent interior walls 20 of fitting 10 to provide a relatively smooth flow path through the fitting. The body portion 116 has a side 120 (corresponding to sides 54) extending from opposing undersides of ring 110 and configured to fit into fitting recess. The upstream and downstream edges of the side 120 form walls 122a, 122b, respectively. The walls 122 form a generally U shaped or horseshoe shaped surface, with a circular hole. The sealing device 28 resembles a large finger ring with a flat ring surface 110 when seen from the bottom or sides. A tight fit of the side 120 and walls 122 with the fitting recess is not required. The walls 122 join the ring 110 to form cords on the circular ring 110. Flats 124 have a straight side formed by the juncture with the straight walls 122 and having a curved side formed by the circular ring. The flats 124, together with the ring 110 and top or exterior portion 118e of the wall 118, completely extend across the port 16 to block fluid flow out the port.

As desired, stiffening plates 126 (FIG. 12) may be used to ensure the ring 110 is sufficiently strong. One plate 126 is shown extending orthogonal to axis 14 through the center of the ring 110. A cylindrical boss 128 is optionally formed at the center of the ring 116, extending from the wall 118. A hole 130, preferably about ⅛ to ¼ inch diameter is formed in the boss 128. The hole 130 can receive threaded fasteners to hold a decorative plate (not shown) to cover the exterior surface of the ring 110 and conceal from view the non-flat surface contained within the ring 110 in order to present a more aesthetic appearance. Advantageously the cover has a plastic interior with a metal exterior and is configured so that no plastic portions of the fitting 10 or of the sealing device 28 are visible. Preferably, the decorative cover forms a service access cover blocking holes through any walls and concealing unattractive portions of the plumbing from view.

The fitting 10, testing device 26, the body of valve 74, rotary 84 and sealing device 28 are all preferably molded of a suitable polymer material. ABS or PVC plastic is believed suitable. As used herein, "integral" means that each part is molded entirely at once, with all portions molded simultaneously rather than molding parts separately and joining them together.

The port 16, test device 26 and sealing device 28 are large enough that a ball that is preferably about 0.5 inches smaller than the nominal diameter of the pipeline, up to a ball diameter that is about the same diameter or slightly larger than the inner walls 20 of the fitting 10, can be inserted through the port 16. The bottom of the faces 46 at the openings of interior walls 20 are spaced apart a smaller distance, and may be a distance of about 0.2 to 0.5 times the nominal diameter of the pipeline, and preferably a distance of about 0.3 times that diameter. The distances will vary with the inclination angle of the faces 46a, 46b. But the spacing is desirably sufficient to allow a ball with the above specified diameter to pass through the port 16 into the fluid passageway to travel along axis 14.

The above described embodiment uses a single sealing ring 48, but there could be two sealing rings, one on each face 46a, 46b, sealing with the adjacent wall 24a, 24b, respectively. Two sealing surfaces allows the testing device 26 to be bi-laterally symmetric so that it can be inserted into the port 16 in either orientation and still seal well. If only one sealing ring 48 is used on the upstream side, then the water pressure from the upstream side can sometimes move the testing device along the axis 14 sufficiently to cause leakage on the upstream seal 48. By placing a sealing ring, or preferably a stiff rib 50 on the downstream side, a substantially watertight seal can be maintained by the upstream side of the device seal. Further, the surface of the testing device 26 can itself form a fluid tight seal with the abutting wall(s) 24a, 24b, as for example by tapering the device 26 relative to the fitting recess and fitting walls 24a, 24b or engaging portions of the fitting 10 in order to form a wedge seal. This wedging effect to increase the sealing force can also be advantageously used with sealing ring 48. The sealing preferably prevents leakage around the circumference of the flow path along axis 14 in fitting 10 when the testing device 26 is completely inserted into the fitting 10 and engages the entire periphery of fitting recess.

Figure 1B:
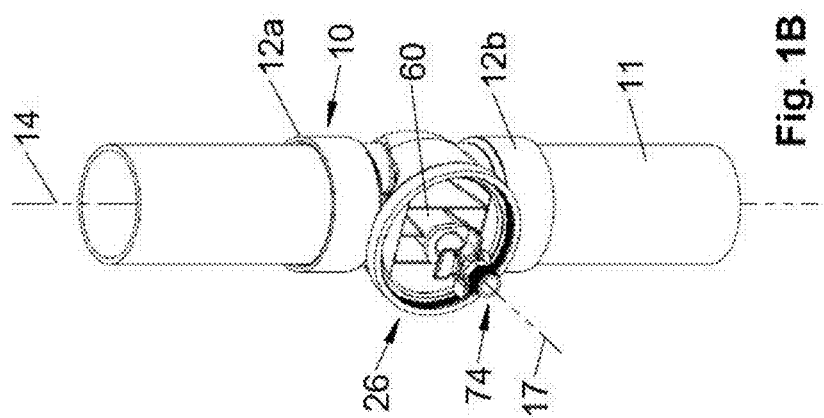
FIG. 1B is a perspective view of the pressure testing device inserted in the cleanout fitting of FIG. 1A.
Figure 1A:
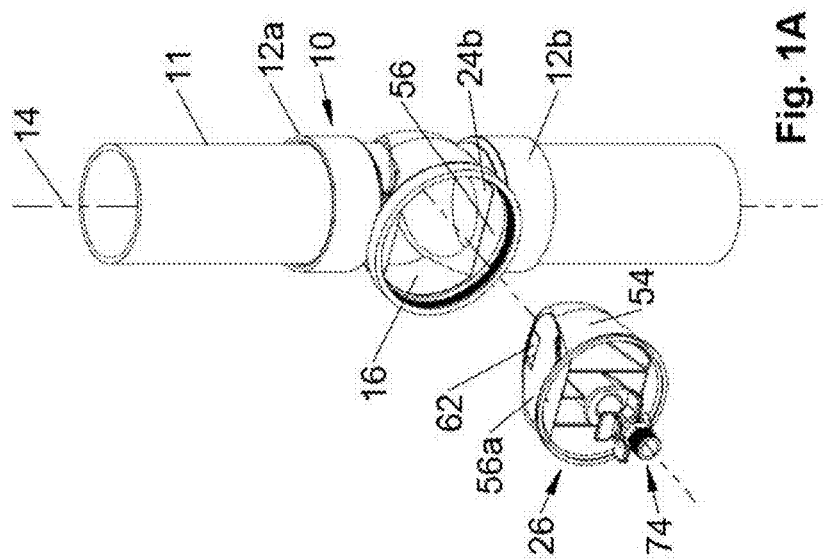
FIG. 1A is an exploded perspective view of a cleanout fitting with a pressure testing device.

The fitting 10 is mated with at least one end of a pipe in the pipeline. As depicted in FIGS. 1A-1C, the ends 12a, 12b of the fitting 10 advantageously form female pipe sockets (FIGS. 1A-1B) which are appropriately sized to receive the mating pipe ends of the pipeline, having a shoulder against which the ends of the pipeline abut. Advantageously, a recess 138 in this shoulder is provided to receive debris or any excess adhesive if the fitting 10 is adhered to the pipeline. Alternatively, the pipe end could have female sockets and the ends 12 comprise male fittings. Further, pipe ends could be other types of fitting, adapters, or pipe ends which abut ends 12 and use other mechanisms to secure them in place. One such mechanism is shown in FIG. 1C, where the ends 12a, 12b of the fittings are configured to abut the ends of a pipeline, with a sealing tube 140, such as a strip of elastomer (e.g., rubber) or a flexible tube of elastomer sized to fit over or bend around abutting ends of the fitting and pipeline. Hose clamps 142 encircle the pipeline, fitting 12 and sealing tube to hold the parts together. Such holding mechanisms are known in the art. Optionally, a raised tab 144 can be located adjacent the ends 12a, 12b of the fitting to indicate a suitable distance by which the sealing tube 140 should overlap the ends 12a, 12b of the fitting 10 in order to comply with applicable regulations.

The ends 12 may be mated and joined to the pipeline or plumbing fixtures in a sealing manner by any of a variety of known ways, such as cementing, soldering, threading, abutting, using packing rings, etc., as appropriate to the material of the parts being joined. Advantageously the pipe ends and fitting 10 are both made of a polymer, such as ABS (acrylonitrile-butadiene-styrene) or PVC (polyvinyl chloride) plastic and can be adhesively bonded. The parts could be made of dissimilar material or of cast iron, and joined by other ways suitable for joining the materials selected, including threads using pipe thread sealing compounds or hub-less devices using clamps.

After at least one pipe end is joined to the fitting 10, if it is desired to pressure test the joined pipeline, then the testing device 26 is inserted into the port 16 so that the device 26 enters all portions of the fitting recess and forms a fluid tight seal around the circumference of the flow path along axis 14 through main fitting 10 to block flow through the fitting 10. The retaining ring 30 fastens to the fitting 10 to hold the testing device in position during testing. Water or other fluid passes through tubular stem valve 74 to pressurize the upstream side of the fitting 10 and any pipeline joined thereto to test for leaks under pressure. The distal end of testing device 26 advantageously does not abut the bottom of fitting recess, but preferably leaves a gap comprising a debris trap so that any debris in the fitting can be urged by gravity into the trap and thus avoid interfering with proper fitting and sealing of the testing device 26.

When the testing is completed, the pressure in the line is released by moving tubular valve stem 74 or, if the pressure is sufficiently low, by wholly or partially withdrawing the testing device 26 after the ring 30 is loosened or removed. The small opening formed by flow through the valve seat 68 when the valve end 90 of the tubular stem valve 74 is slightly retracted from the valve seat, relieves high pressure and helps reduce the likelihood that the high pressure in the line will force the testing device 26 out of the fitting 10 where it may injure someone. Further, the mating threads 29 on the retaining ring 30 and fitting 10 engage to prevent the testing device 26 and its tubular stem valve 74 from being violently expelled from the fitting by the pressure in the line.

The distal end of sealing device 28 also preferably ends before abutting the bottom of the fitting recess so as to leave a debris trap available to collect debris and avoid any blockage that might prevent the sealing device 28 from aligning the opening formed by cylindrical walls 118 with the interior of the passage through the fitting 10 as needed. The sealing device 28 is preferably, but optionally, bilaterally symmetric so that it can be inserted into the port 16 and form a sealing engagement in either of two orientations. Flats 124 on the sealing device abut flats 34 in the fitting in order to limit the insertion of the sealing device into the fitting 10, but this is optional.

The sealing device 28 preferably but optionally, also provides a preconfigured flow surface on the inside of the fitting. The preconfigured flow surface defined by cylindrical interior wall 118 is preferably shaped so that the interior flow passage of the fitting reduces the collection of debris from the fluid flowing through the fitting during use of the plumbing line. Advantageously it provides a substantially continuous surface with no substantial recesses, cavities or protrusions, and especially provides a surface lacking such discontinuities as would be prohibited under plumbing codes for such pipelines.

If the fitting 10 is made of a thermoplastic polymer (e.g., PVC, ABS, etc.), then the testing device 26 is preferably in place when the fitting 10 is bonded to any of the adjacent pipeline in order to avoid any overflow of bonding adhesive from entering the fitting recess and inhibiting later entrance of the devices 26, 28 into and out of that recess. Preferably, the main fitting 10 is made of PVC or ABS, with either or both of the testing device 26 and sealing device 28 being made of a different material to make the adhesive bonding to the fitting 10 more difficult. The testing device 26 and sealing device 28 are thus preferably made of a material different from the fitting 10, and preferably is made of a polymer such as EPDM or a polyethylene, polypropylene or nylon, that will not adhere to the fitting 10 with common pipe cements. This helps avoid accidentally gluing the testing device 26 or sealing device 28 in place. The devices 26, 28 can be cast, machined, injection molded, compression molded or blow molded, depending on the materials used. Injection molded polymers are believed preferable.

While the testing device 26, sealing device 28 and tubular stem valve 74 are preferably molded integrally of a single material with the various sealing surfaces 48, abutting surfaces 50 or recesses for receiving various sealing rings, one or more of them can also be molded around an insert of metal or other material to provide additional strength and rigidity. This molding over a strengthening frame or insert can be particularly useful as it allows the exterior mating surfaces of the testing device 26 to be made of a resilient material that may readily form a good seal with the abutting surfaces of the port 16 and fitting recess. An EPDM material compression molded onto a steel insert is believed suitable, as is a TPE material overmolded onto a molded nylon insert. Further, the fitting 10, testing device 26, sealing device 28 and tubular stem valve 74 could be made of metal, and if so, the fitting is preferably made of cast iron.

The tubular stem valve 74 provides a fluid passage that may be used as a fill and drain port in fitting 10. The fluid passage provides an opening extending from outside the fitting 10 to the inside of the fitting. The inlet end at or adjacent threads 76 allows a fluid line to be coupled to the tubular stem valve 74 to fill or drain the fitting 10 and any attached pipeline. Threads 76 are shown and are preferably configured to receive a garden hose, but other sizes and shapes of the inlet end could be used. The fluid passage extends through the tubular stem valve 74 and opens into the inside of the fitting 10 in the flow passage, through valve seat 68 that can be selectively placed in fluid communication with only the upstream facing recess 62 in a first position, or both the upstream and downstream facing recesses 62, 64 in a second position. Actuation of the rotary valve 84 in combination with the tubular stem valve 84 provide further fluid flow options as discussed herein.

Figure 6A:
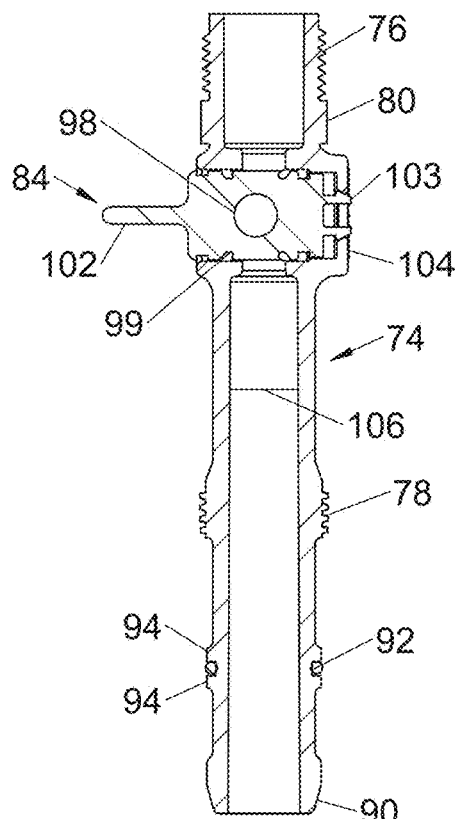
FIG. 6A is a sectional view taken along 6-6 of FIG. 5, with the rotary valve closed.
Figure 6B:
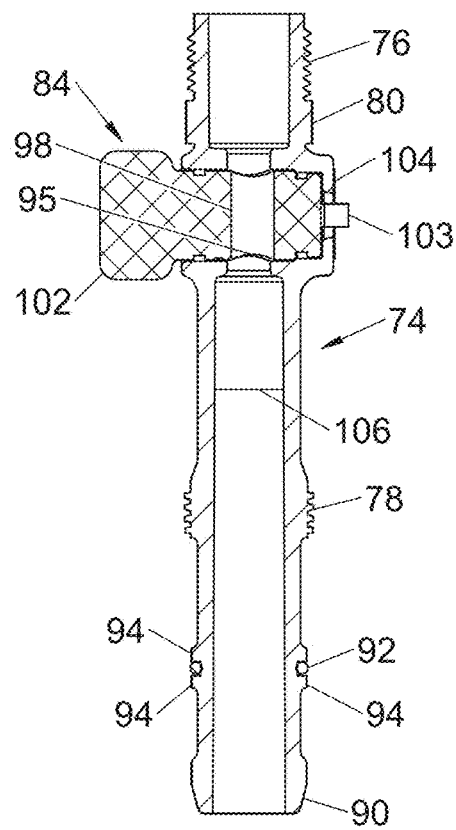
FIG. 6B is a sectional view taken along 6-6 of FIG. 5, with the rotary valve open.

The tubular valve stem 74 has a first position that blocks flow from the first upstream opening 62 to the second downstream opening 64 and a second position that allows flow through the first and second openings 62. 64. The tubular valve stem 74 has a fluid passage therethrough in fluid communication with the first opening 62. The second valve 84 is on the tubular valve stem 74. The second valve 84 has a fluid outlet (e.g., by threaded end 76) that is accessible externally of the testing device 26 (and fitting 10). The second valve 84 is in fluid communication with the fluid passage through the valve stem 74 and has a first position allowing fluid flow through the tubular valve stem and through the second valve outlet as shown in FIG. 6B. The second valve 84 has a second position blocking flow through the second valve outlet as shown in FIG. 6A.

Referring to FIG. 2, FIGS. 5-6 and especially to FIG. 5, the rotary valve 84 advantageously comprises a cylindrical body 96 sized to fit in cylindrical recess 97 in the tubular valve stem 74. A through hole passing through opposing faces of the cylinder to form fluid passage 98. Ring seals 95, such as O-ring seals or D ring seals encircle the periphery of opposing ends of the body portion 96 to seal with the walls of recess 97. Further, two seals 99 are located on opposing sides of the body 96 between the fluid passage 98 and offset 90 degrees from the fluid passage. Advantageously the seals 99 are O ring seals or D ring seals encircling a raised boss 100 and seated in a groove 101 encircling and defining boss 100. A handle 102, shown as a flattened finger grippable tab, extends from one end of the body 96. Notched tabs 103 can extend from the end of the body 98 opposite the handle 102. The tabs 103 can fit through an opening in the end-wall 104 blocking one end of recess 97.

In use, the cylindrical body 96 fits into recess 97 of the valve stem 74 with the handle 102 being externally accessible. The recess 97 is perpendicular to the longitudinal axis of the stem valve 74. Rotation of the handle 102 by 90 degrees aligns either the flow passage 98 or the boss 100 and seals 99 with the interior passage through the stem valve 74 in order to allow passage through the rotary valve 84 and its passage 98, or to block flow through the rotary valve 84 (via boss 100 and seals 99).

The groove 101 and ring seals 99 are configured to better withstand the testing pressure of the pipeline 11. While ring seals 99 are preferred, a taper on body 98 abutting tapered recess 97 could also be used to form a fluid tight seal. Further, instead of ring seals 99 in grooves 101, the seal 99 could take the form of a rib or raised surface on the exterior surface of cylinder body 96 configured to seal with the recess 97.

The various ring seals 38, 48, 50, 92, 95, 99 advantageously abut opposing surfaces to form fluid tight seals blocking fluid flow past the seals. The various ring seals could be replaced with ribbed surfaces, or discrete seals could be replaced with flat, tapered surfaces to form the fluid tight seal.

Figure 3:
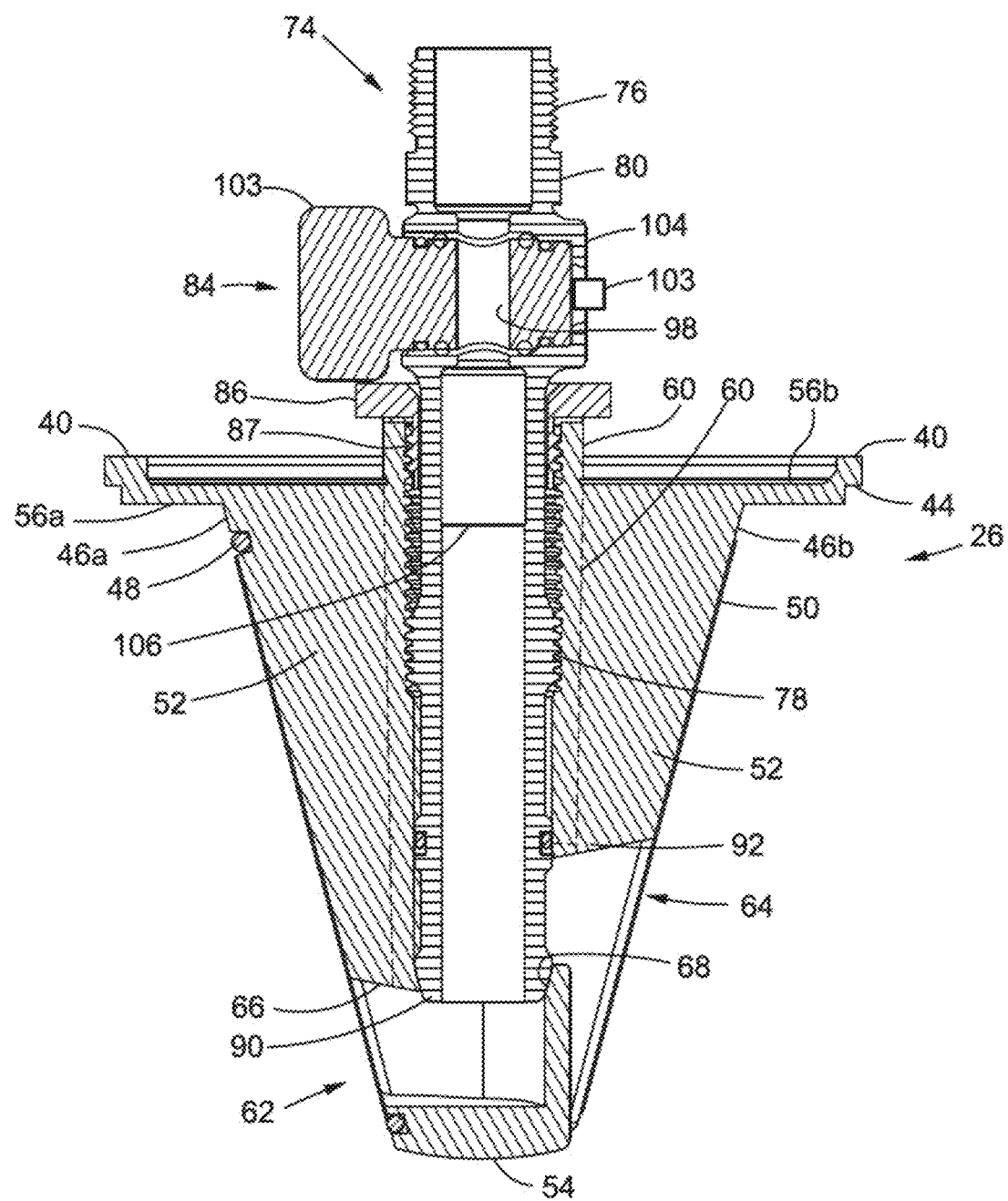
FIG. 3 is a cross sectional view of FIG. 2 taken along section 3-3 of FIG. 2.

Referring to FIGS. 3 and 6, an optional membrane seal 106 may optionally be formed across the tubular flow path through tubular stem valve 74, between the valve surface 90 and the rotary valve 84, so as to block flow through that stem valve to the rotary valve 84. The membrane seal 106 advantageously comprises a thin wall molded integrally with and at the same time as the tubular valve stem 74. By passing a rod or screwdriver through one end of the stem valve 74, the membrane seal 106 could be opened or removed to allow flow through the tubular valve stem to the rotary valve 84. By making the membrane 106 thin at the juncture with the inside of the tubular passageway inside the valve stem 74, the membrane 106 can become a knock-out membrane that is more easily removed in its entirety. Once the membrane seal 106 is broken it is not normally resealed. It allows a simplified stem valve by allowing rotary valve 84 to be removed or omitted. It also provides a redundant seal to rotary valve 84, thus allowing looser tolerances on the seals used in the valve 84 when membrane seal 106 is in place and un-broken.

The fitting 10 and pipeline 11 are shown as a T fitting. But the fitting 10 could be any conventional fitting shape, including a Y fitting, L fitting, end fitting, etc. into which the cleanout functions and testing functions of the current invention can be adapted.

Figure 14:
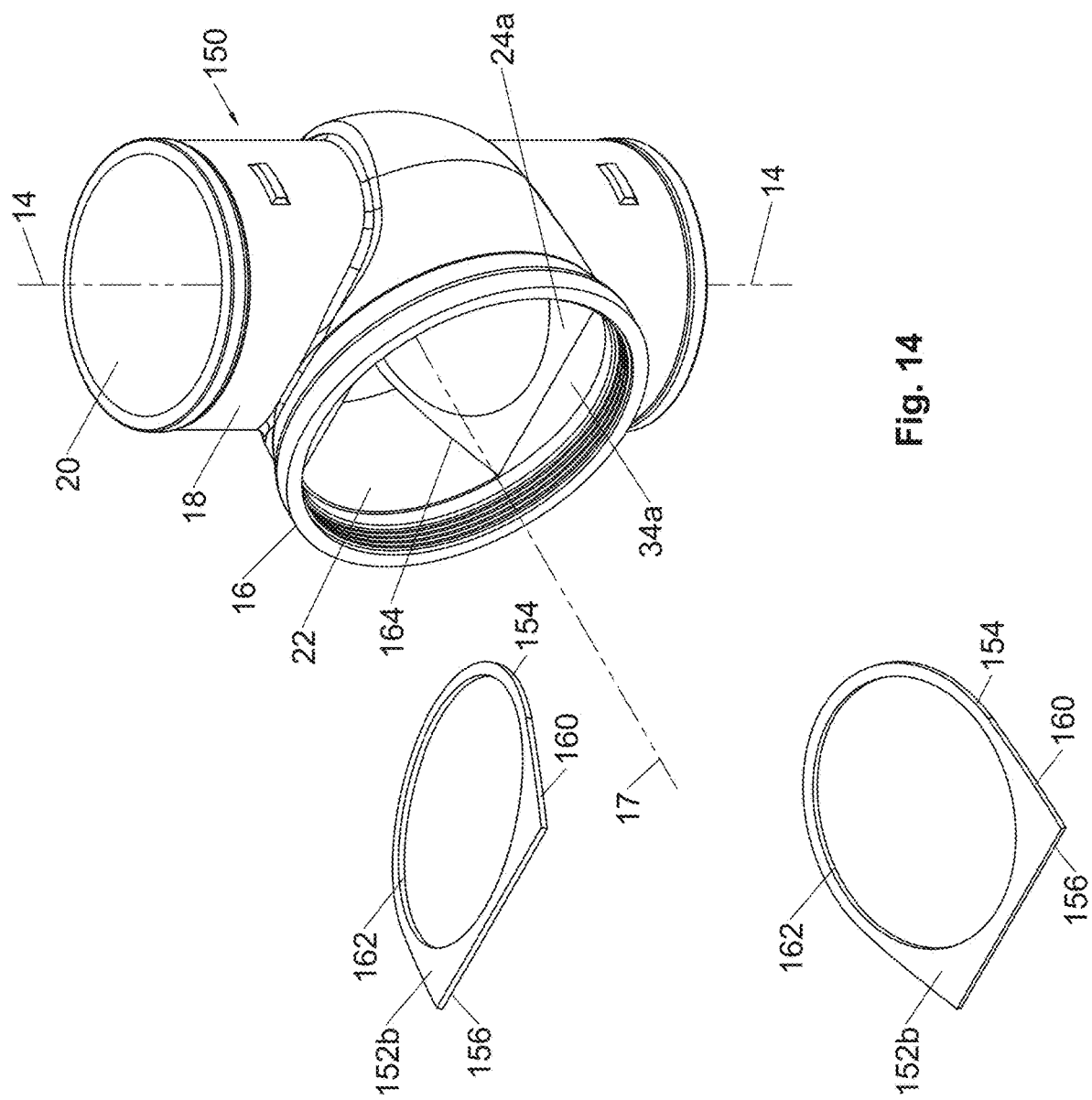
FIG. 14 is an exploded perspective view of the fitting shown in FIG. 13A.

Referring to FIGS. 13-14, a further embodiment of this invention is shown in which the previously described fitting 10 comprises a modified fitting 150 that is optionally, but typically, made of metal, such as cast iron. The fitting 150 has ends 12a, 12b configured to abut the adjoining pipeline 11 and to be joined as in FIG. 1C, rather than having enlarged female ends as in FIGS. 1A-1B configured to receive the ends of the pipeline. The fitting 150 has a longitudinal axis 14, exterior and interior walls 18, 20, port 16 preferably with internal threads, and has recess 22 with inclined walls 24a, 24b and flats 34a, 34b. A planar insert 152 abuts each wall 24. The insert 152 is shaped to conform to the shape of the wall so the outer periphery has a curved periphery portion 154 conforming to the intersection of the walls 24 with the fitting 150 and the circular port 16, with an optional straight top 156 flat aligning with the flats 34a, 34b in use. The inner peripheral edge 158 of the insert 24 is configured to conform to the cylindrical flow path along axis 14 and thus provide a smooth and substantially straight flow path with interior fitting walls 20. The overall shape of the inner periphery will be slightly elliptical since the walls 24 are inclined to the longitudinal axis of flow path 14 as best seen in FIG. 13A.

The inserts 152 advantageously have inner and outer peripheral edges 160, 162 joining opposing faces 164a, 164b. Preferably, the outer peripheral edge 160 is perpendicular to the opposing faces 162a, 162b as best seen in FIG. 13B. The inner peripheral edge 162 of each insert 152 is preferably, but optionally not perpendicular to the opposing faces and instead is inclined at an angle so that it is parallel to longitudinal axis 14 to provide a smooth flow path 14 so that if correctly aligned it forms part of a substantially straight flow path along longitudinal axis 14. The angle of inclination is preferably the same or about the same as the angle of inclination of the walls 24 in the fitting 150.

The recess 22 advantageously has a ledge 164 (FIG. 14) formed perpendicular to each face 24a, 24b, so that the outer peripheral edge 160 of the inserts 24 sit flat on the ledge 164. The ledge is best seen in FIG. 13A, at the bottom of the fitting opposite the port 16. The inserts 152 thus have one edge (outer edge 160) perpendicular to the opposing faces 152a, 152b, and one edge (inner edge 162) angled.

The inserts 152 are advantageously made of a softer metal such as copper, aluminum or brass, but are preferably a polymer material. It is difficult to finish the walls 24 to a sufficiently flat tolerance to ensure good fluid seals. The inserts 152 help provide a flatter surface for sealing. The inserts 152 could be press fit into place. Preferably though, an adhesive 166 (FIG. 13B) fastens the inserts 152 to the walls 24, and optionally also fastens the inserts to the recess 22 and/or interior wall 20 of fitting 150. A waterproof adhesive is preferred.

Figure 15A:
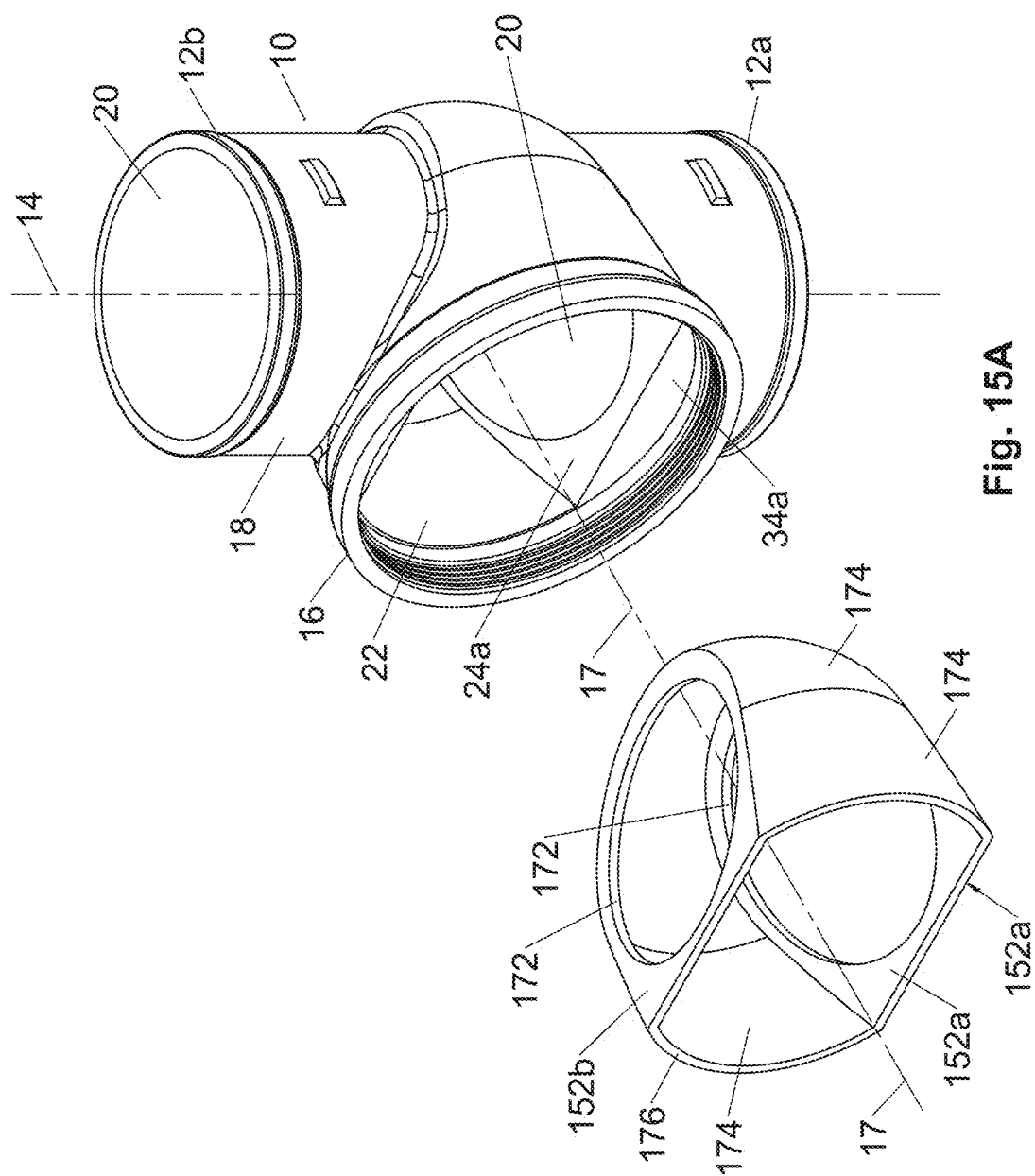
FIG. 15A is an exploded perspective view of the fitting of FIG. 13A with a unitary insert.
Figure 15B:
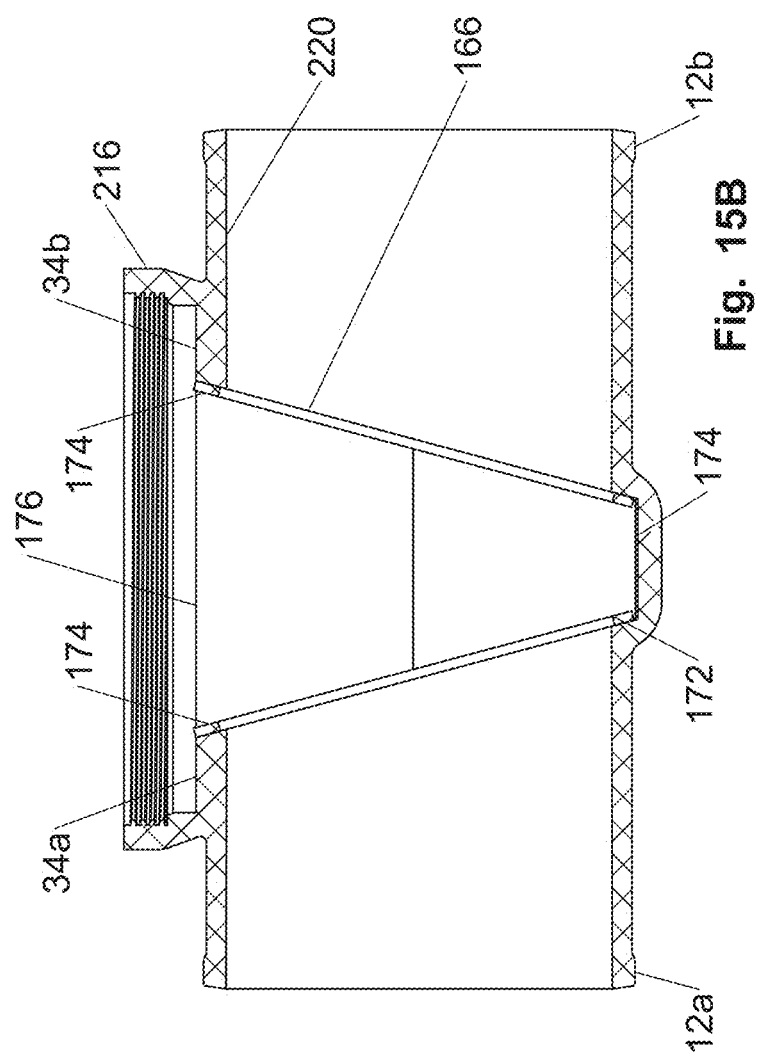
FIG. 15B is a cross sectional view of the fitting of FIG. 15A with the insert in position for use.

Referring to FIGS. 15A-15B, the inserts 152 are formed as part of a unitary insert that is integrally molded of as polymer, preferably a suitable plastic, to form unitary insert 170 having opposing walls 172a, 172b which correspond to 152a, 152b except the side walls 172 are joined together by side 174. The side 174 conforms to the shape of the recess 22 in fitting 150. The side 174 is shown as slightly curved outward since the port 16 intersects with the fitting 150 with the sides slightly curved outward. If the shape of the intersection of port 16 and fitting 150 alters, then the shape of the side 174 will alter, for example to a more flat, cylindrical shape. The walls 172a, 172b are configured to abut walls 24 in fitting 150, and have a large generally circular (but slightly elliptical) opening conforming to the flow path through the fitting 150. The opening is slightly elliptical because the walls 174 are inclined so the circular flow path through fitting 150 intersecting the inclined walls form an elliptical opening. The shape of the elliptical opening varies with the inclination of the walls 24, 174.

The unitary insert 170 has an inner peripheral edge 162 on the opening for the flow path, with that edge preferably, but optionally, being inclined to be parallel to the longitudinal axis 15. An inclination angle about, or the same as, the angle of inclination of the walls 24 to the axis 17 is believed suitable. The unitary insert 170 has a flat upper edge 176 conforming in shape to the opening the flats 34 form in the circular port 16.

The unitary insert 170 is inserted into the port 16 and is configured to fit into recess 12. It is preferably fastened to the fitting by adhesives located between and on the facing walls 24 and 172. The ledge 164 is preferably not used in this embodiment, but its presence is acceptable. It is difficult to finish the walls 24 to a sufficiently flat tolerance to ensure good fluid seals when the fitting is made of cast iron. The insert 170 helps accommodate this by providing a flatter surface for sealing. The insert 170 could be press fit into place. Preferably though, an adhesive 166 fastens the insert 170 to the walls 24 and optionally also fastens the inserts to the recess 22 and/or interior wall 20 of fitting 150. A waterproof adhesive is preferred.

There is thus advantageously provided insert 170, which is preferably non-removable and configured to be placed in the recess 22 and fastened to the fitting 150 and configured to define a substantially straight flow path through the fitting 150 while providing a sufficient flat surface to the testing and sealing devices 26, 28 for operational uses. The insert 172 accommodates rougher surfaces on the cast iron fitting 150 and provides smoother and flatter surfaces adapted to seal against the pressure testing device 26 and sealing device 28. The inserts 172 can be used with any of the testing devices described herein, with the configuration of the inserts 172 altered to mate with the walls 24 of the fitting, or the analogous walls of the various fittings described herein.

Referring to FIGS. 16-20, a further embodiment is shown having a fitting adapted for a single sided seal on the testing device and the accompanying sealing device are disclosed. The altered parts with corresponding parts in the earlier embodiment usually have the parts numbers incremented by 200, with the unchanged parts usually using the original part numbers. The prior detailed description of the same or analogous parts are not repeated here in order to shorten the description, but such parts have the previously described construction, functions and advantages.

The fitting 210 has upstream and downstream ends 12a, 12b, respectively, and longitudinal flow path 14. Outer and inner fitting walls 218, 220 define a flow path along axis 14 which flow path is preferably cylindrical. A circular port 216 is formed on the outside of the fitting 210 to form a T fitting, although the orientation of the port 216 could be at other angles or locations to form different fittings such as Y fitting, end fittings or blind fitting, etc. The fitting has a recess 222 which intersects the fitting walls 218 in a complex shape described later. The recess 222 encircles the flow path and longitudinal axis 14 and opens into the port 16. An inclined wall 224a is formed on the upstream side of the recess 222 and port 216 and corresponds to wall 24a. An inclination angle of about 15 degrees is believed suitable. The downstream wall 224b is generally vertical or parallel to axis 17, but slightly inclined toward the wall 222a. Walls 224a, 224b are not symmetric about a plane along axis 17 and orthogonal to axis 14 (walls 24a, 24b are preferably symmetric about that plane). The recess 222 has a shape on the upstream side of axis 17 shaped by the inclined wall 224a, and has a shape on the downstream side of axis 17 shaped by a cylinder about the same as the pipe diameter extending along axis 17 and intersecting the perpendicular tube defining the flow path along longitudinal axis 14.

A test device 226 is inserted into the recess 222 to seal against upstream wall 222a for pressure testing, with the downstream wall 224b being slightly tapered relative to the device 226 to wedge seal 248 on face 246 of device 226 against the wall 222a to form a fluid tight seal for testing. A tube 260 in the testing device 226 accommodates tubular stem valve 74, or an alternative valve 274a (described later). A sealing device 228 is shaped to seal the circular port 216 and fill the recess 222 when the testing device 226 is removed. The sealing device 228 has an upstream side that is flat and inclined and an opposing downstream side that is curved, and the parts connecting these upstream and downstream sides reflect the shape of the recess 222. This is discussed in more detail later.

Figures 16A, 16B:
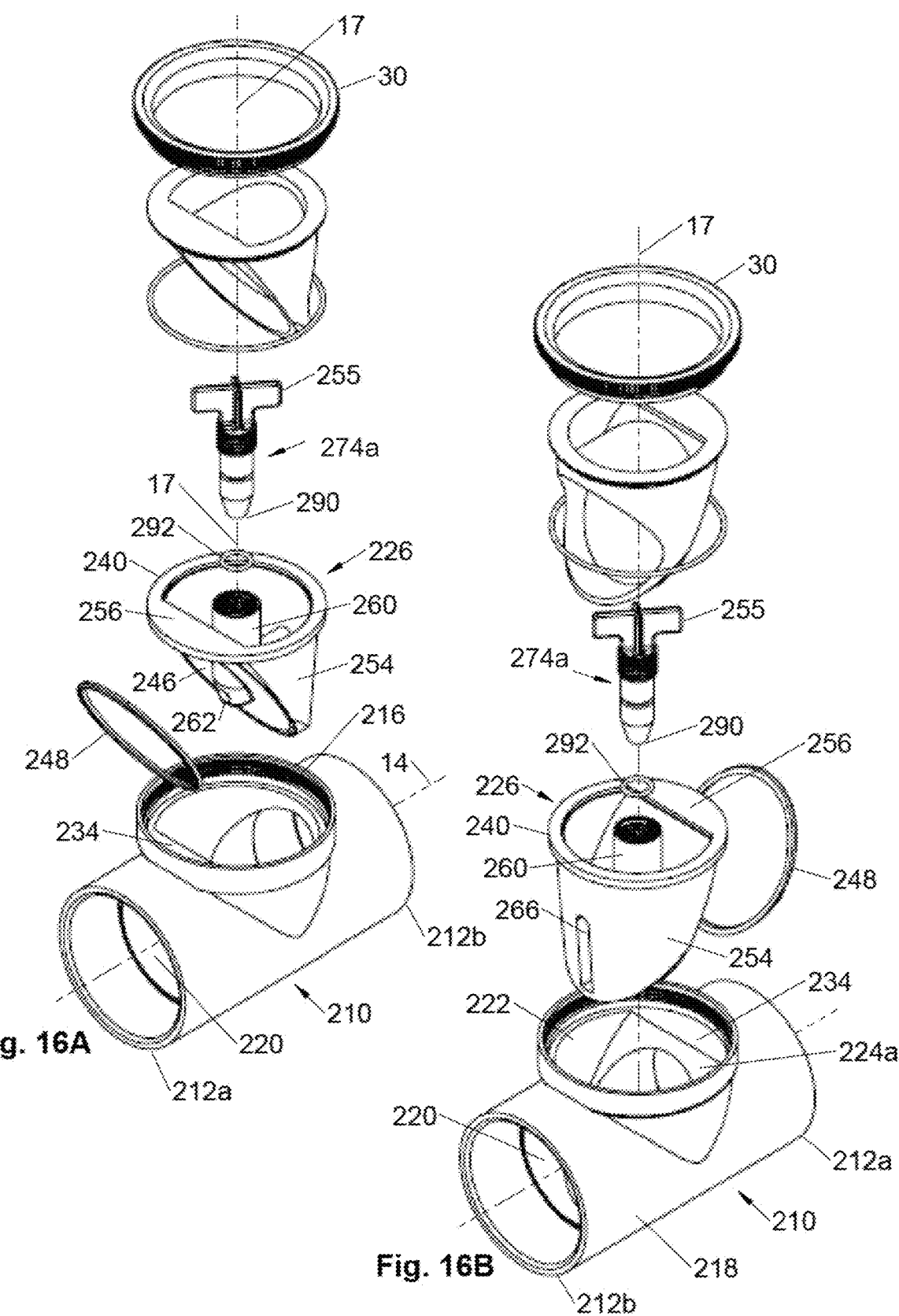
FIG. 16A is an exploded perspective view of a single sided seal on a testing assembly facing in the direction of fluid flow.
FIG. 16B is an exploded perspective view of the a testing assembly of FIG. 16A facing in the opposite direction.

Referring to FIGS. 16-18, the fitting 210 has upstream wall 222a inclined at about 15 degrees. Downstream wall 222b is also slightly inclined, an angle of about 2° to 10°, preferably about 3° to 6°, and ideally about 5°. The wall 222a is flat (planar) and advantageously forms a flat 224a inside the port 216 that has a straight side formed by wall 222a, and a curved side formed by the circular port 216. The downstream wall 222b has a circular cross sectional shape along axis 17, and forms a flat 234b having a crescent shape with the circular port 216 defining the larger curve and the curved, generally cylindrical but tapered shape conforming to testing device 226 forming the smaller curve of the crescent shaped flat 234b. The walls 224a, 224b are spaced apart at a distance sufficient to allow a cleanout device to enter the fitting and pipeline, as discussed relative to walls 24a, 24b.

The port 216 advantageously has threads 29b, preferably internal threads (they could be external) to mate with threads 29a on retaining ring 30. A ring seal 38 is advantageously placed between the retaining ring 30 and testing device 226, or between the testing device 228 and a part of the port 216 to seal the parts. Preferably a ledge 36 on the inside of the port 216 accommodates sealing ring 38, with the ledge encircling the flats 234. Alternatively, the sealing ring 38 could be omitted.

The pressure testing device 226 has a top 40 optionally forming a flange that abuts the faces 234 and sealing ring 48 and is preferably circular in shape to fit inside port 216 and close to the walls forming that port. It has one flat 256 on the upstream side formed by face 246a. The testing device 226 has an upstream face 246a corresponding to the shape of wall 224a, and inclined to abut wall 224a. Ring seal 248 is on the face 246a. The testing device 226 has no flat downstream face and instead the downstream face takes the form of sidewall 254 extending between opposing sides of upstream face 246a. The sidewall 254 may be considered to contain downstream face 246b, but the parts preferably blend together in a continuous curve. The sidewall 254 is generally cylindrical but slightly tapered as described above and mates with recess wall 222b. The downstream face 246b or sidewall 254 does not have to form a fluid tight seal with mating wall 222b, but advantageously wedges the device 226 to urge the seal 248 against upstream wall 224a. The sides of the testing device 226 may have flats 255 (FIG. 17C) to conform to the intersection of the tapered cylindrical device 226 extending along axis 17 and the cylindrical flow path through fitting 210 extending along perpendicular axis 14.

The angle of inclination on walls 224, sidewall 254 and face 246a cannot be too large or the testing pressure will exert enough force on the inclined face 246a to force the testing device 226 out of the port 216 to cause leakage, or if insufficiently restrained, enough pressure to eject the device 226 from the port. Inclination angles of face 246a (relative to axis 17) of less than about 30° are preferred, and the angle is preferably less than 20° and advantageously about 10-15°.

Tube 260 extends from the face 246 to outside the testing device 226 and places those areas in fluid communication. The tube 260 is preferably located on the centerline 17 of the device 226 and port 216 during use. The testing device 226 is preferably hollow with stiffening plates 252 on the interior side of the testing device located as needed. The tube 260 has internal threads 270, with on end extending past the face 246 to form a protrusion on that upstream face.

Figures 18A, 18B:
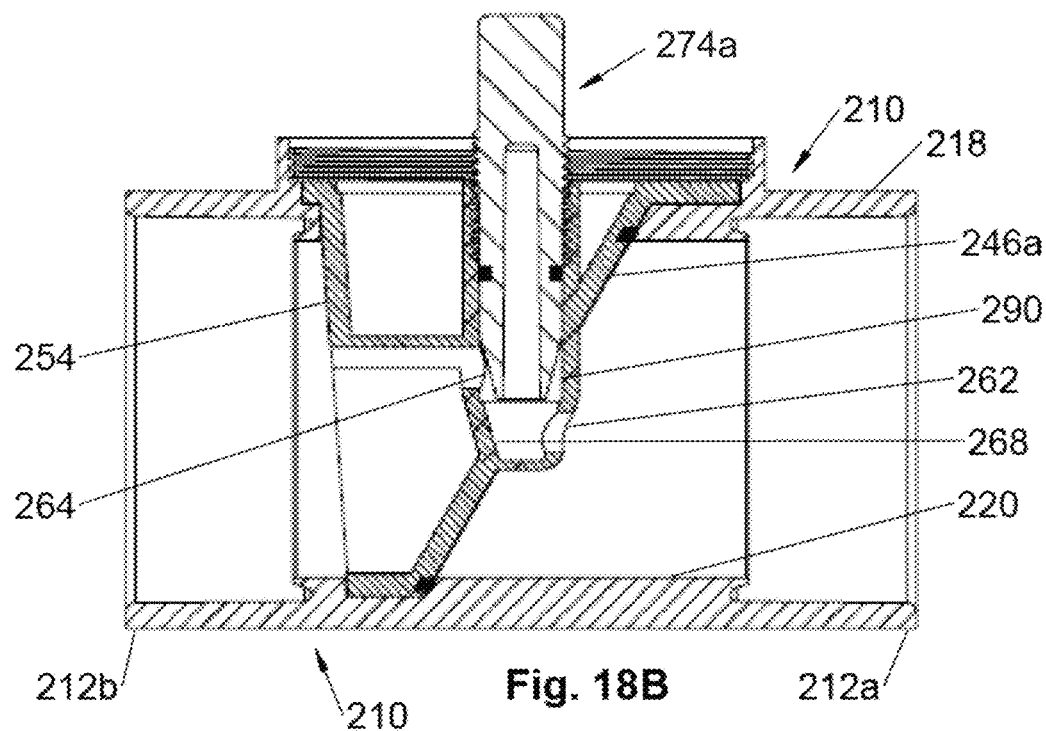
FIG. 18A is a sectional view of the test assembly of FIG. 16 with a pressure testing device and no flow through the device.
FIG. 18B is a sectional view of the test assembly of FIG. 16 with a pressure testing device and flow permitted through the device by a further embodiment of the tubular stem valve.
Figure 18C:
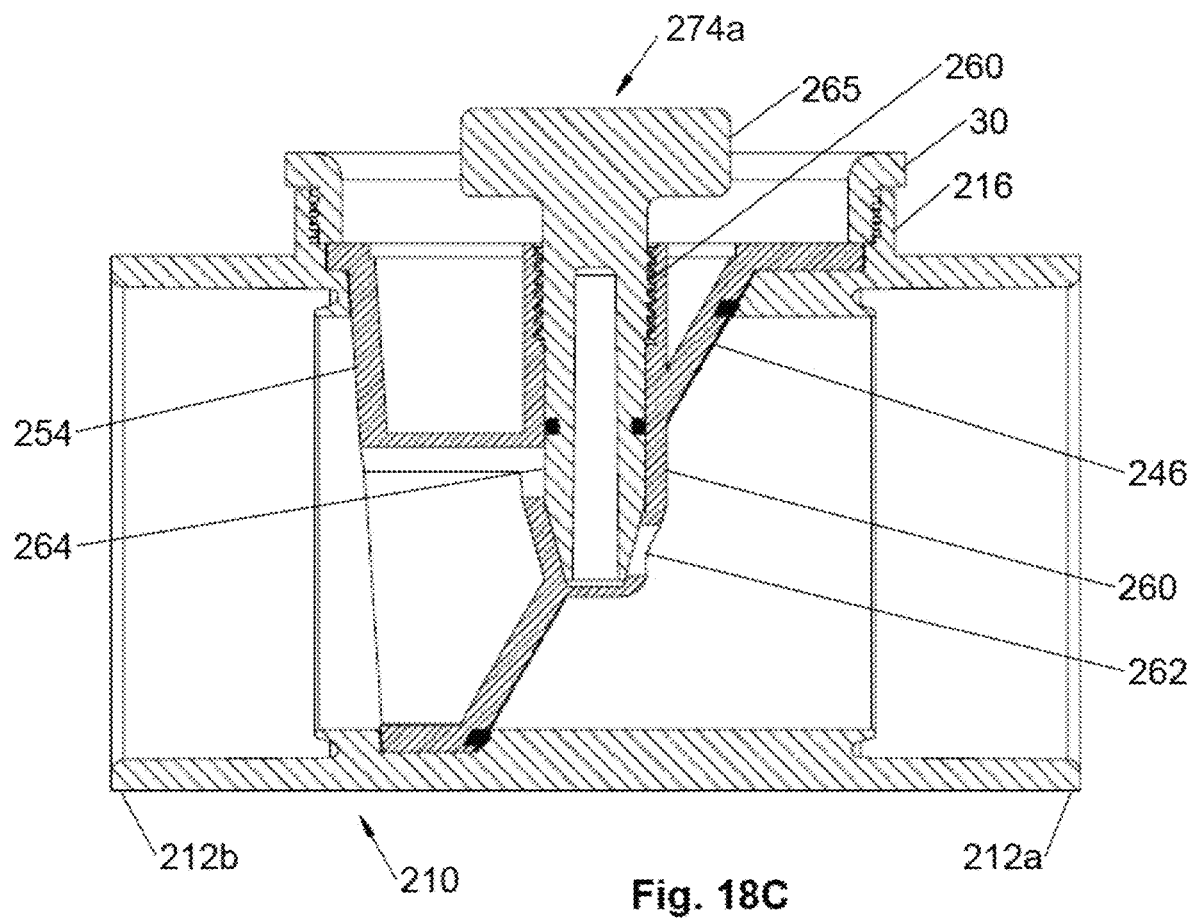
FIG. 18C is a sectional view of the test assembly of FIG. 18B with a pressure testing device and flow through the device blocked by the further embodiment of the tubular stem valve of FIG. 18B.
Figure 19A:
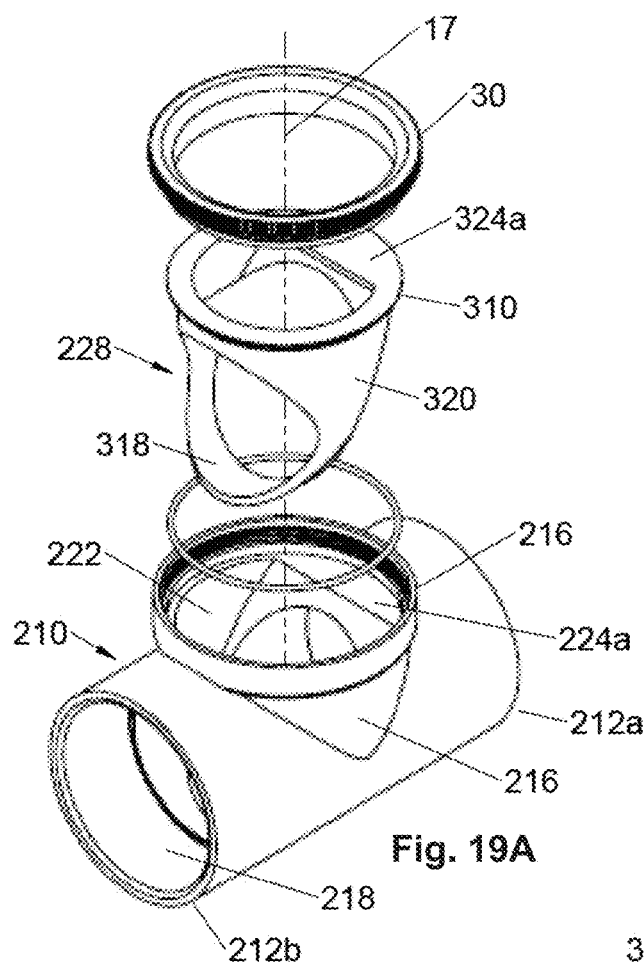
FIG. 19A is an exploded perspective view of the sealing device of FIG. 17A and fitting along an upstream direction.
Figure 19B:
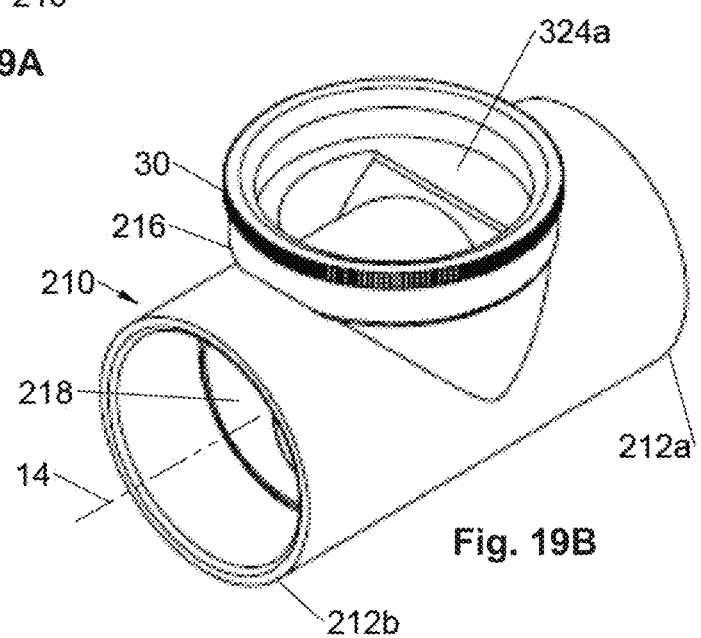
FIG. 19B is a perspective view of the assembled parts shown in FIG. 18A.
Figure 20A:
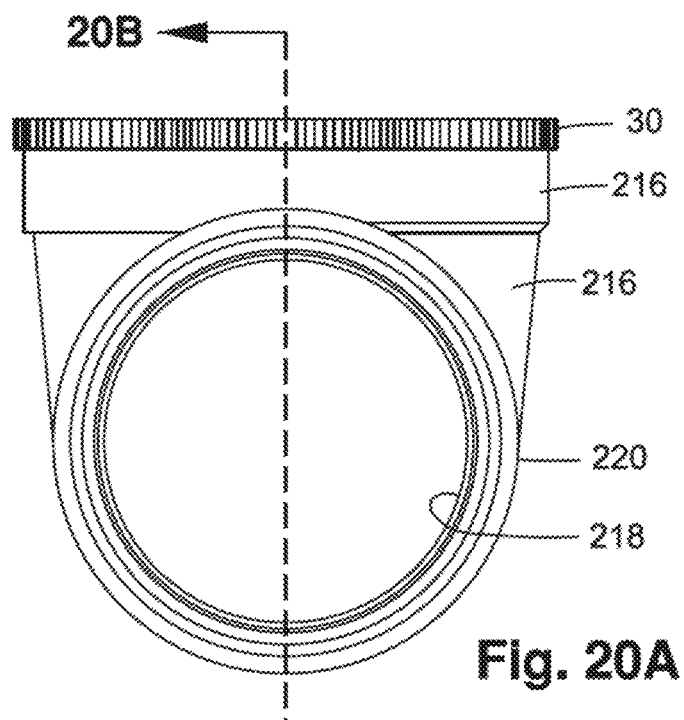
FIG. 20A is an end view of the assembled parts of FIG. 19B.
Figure 20B:
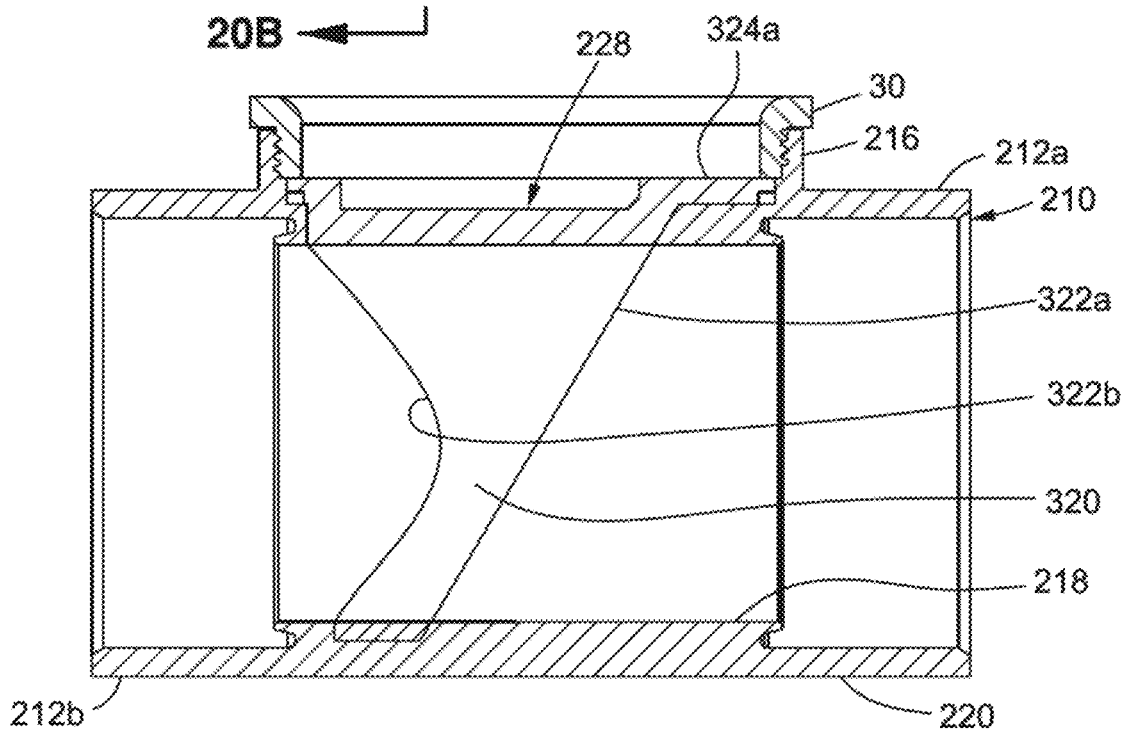
FIG. 20B is a sectional view taken along section 20B-20B of FIG. 20A.
Figure 22:
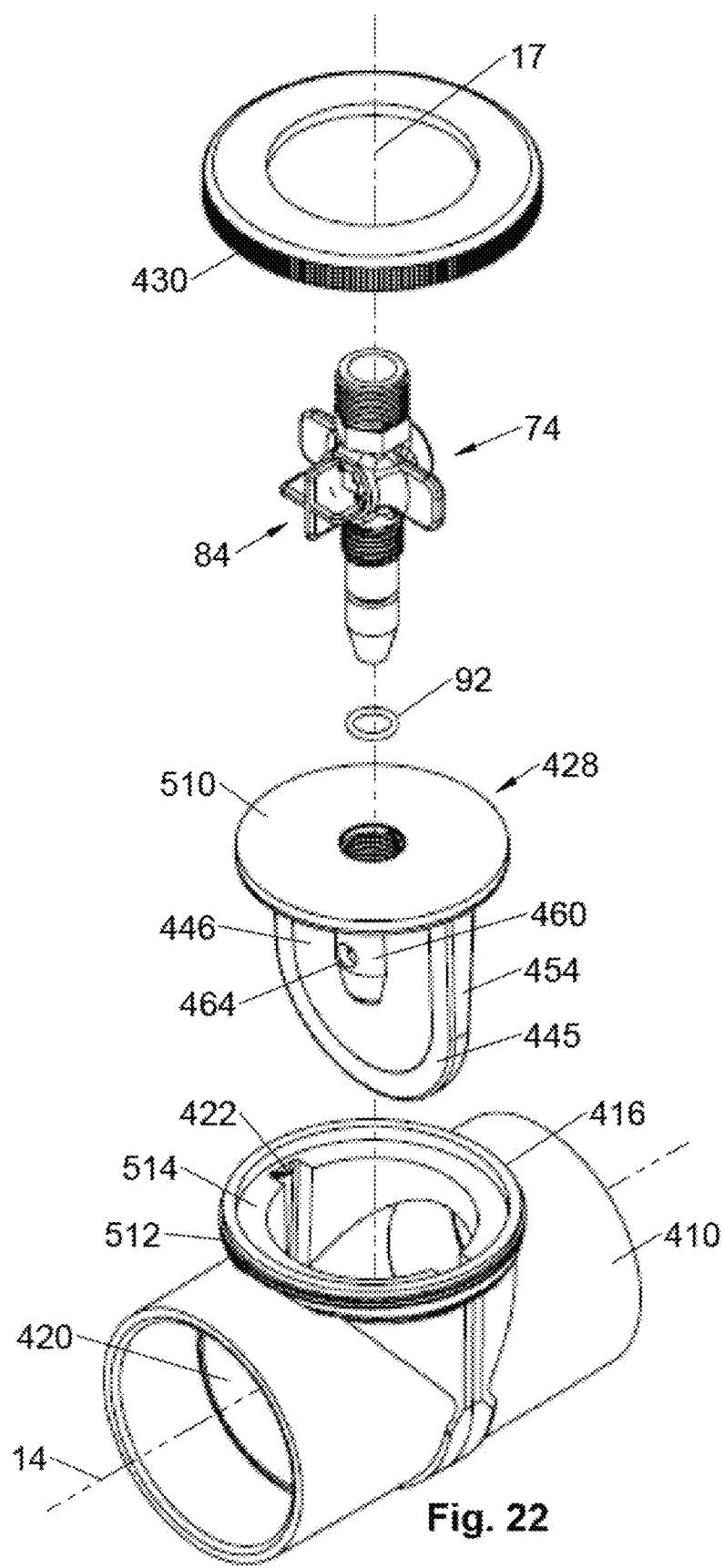
FIG. 22 is an exploded perspective view of a further embodiment of a testing device of this invention.

The testing device has an upstream opening 262 preferably formed in the portion of the tube 260 extending past the inclined face 246, preferably at an end of that tube. The end of the tube 260 is advantageously tapered to form valve seat 290. The opening 262 is preferably a circular opening that may be centered in the valve seat 290 and centered along axis 17, or that may be located on a side of that valve seat as seen in FIGS. 18A-18C. The upstream opening 262 is advantageously close to the bottom wall of the fitting 210, but may be offset more toward longitudinal axis 17 as shown in the figures.

A downstream opening 264 is formed in the sidewall 254 and is in fluid communication with the inside of tube 260. The downstream opening 264 is shown as a circular opening in the side of tube 260 and in fluid communication with a slotted recess aligned parallel to axis 17 and formed by walls 266. The slotted recess is advantageously configured to reduce pressure on the fluid flowing through downstream opening 264. The openings 262, 264 are located relative to each other and sized so that a cigarette but can pass through them under testing pressure and advantageously at about half the testing pressure used to test pipeline 11. The same consideration applies to the shape of any recess leading to or from the openings 262, 264 (or openings 62, 64). The shape of tube 260 and the parts in fluid communication therewith may vary depending on specific design considerations. The downstream opening 264 is located above upstream opening 262 along axis 17, with above being toward the port 216, but the relative positioning can vary.

The use of the pressure testing device 226 is like that of testing device 26 when stem valve 74 is inserted into tube 260 so threads 278 mate with internal threads 270 on the tube 60 (FIG. 18A) to provide for multiple flow configurations using the two valves formed on or by valve stem 74.

FIGS. 16, 17 and 18B-18C show a further valve stem 274a that lacks rotary valve 84. A ring seal 292 encircles the valve stem 274a, preferably in a groove in body of the stem 274a. The seal 292 keeps fluid from squirting out of tube 260 along axis 17. Threads 278 on the stem 274a engage threads 270 on the tube 260 to move the valve along axis 17 to control fluid flow through the testing device 226 through openings 262, 264. FIG. 18B shows the flow open configuration or position, while FIG. 18C shows the flow closed configuration or position. Valve member 290 on the end of valve stem 274a cooperates with the seat 268 to control the flow. Manual gripping portions such tabs 265 allow rotation of the valve stem 274a and flow control. The tubular valve 274a is shown with a hollow blind passage through its center for ease of molding, but it need not be hollow.

Referring to FIGS. 16 and 19-21, after pressure testing is completed the testing device 226 is removed and sealing device 228 is inserted and held in place by various means, preferably retaining ring 30. The sealing device 228 has a circular periphery on its top with threads 312 and shoulder 314 to abut sealing ring interposed between the device 228 and fitting 210 or port 16. The body portion 316 has a complex shape generally formed by the intersection of two cylinders at right angles to each other (vertical and horizontal), but with a flat slice taken from the end of one cylinder (the vertical one). The interior wall 318 is cylindrical to match the flow path through pipeline 11 and fitting 210. The side 320 extends from opposing sides of the annular ring 310. The upstream wall 322a is straight and inclined to abut wall 222a and is shaped similar to that wall. The downstream wall 322b has a curved profile (FIGS. 21C-D) when viewed from the side. The bottom of the side 320 is flattened. No boss is shown in this configuration, but a boss and hole for mounting a cover could be added. The flat wall 312a abuts the top ring 310 to form a chord of that ring and form flat 124*a*. As seen in FIG. 21B, the lateral sides of the sealing device on opposing sides of the flow path and on the upper portion, are flat rather than curved outward as is the recess 222. That portion could be curved outward, but only the inner wall 318 need conform to the flow path through the fitting, the outer portion must conform to the upstream and downstream portions of the recess 222, but not to the interior of the recess 222. Thus, flats can be used on the side portions identified above.

The sealing device 228 is used analogous to device 28 to seal the port 216. The description of the details of the construction and use are not repeated.

Referring to FIGS. 22-26, a further embodiment is shown. The part numbers for analogous parts in this embodiment will be incremented by 400, and the detailed description of these analogous parts will not be repeated. The fitting 410 has upstream and downstream ends 412*a*, 412*b* along longitudinal axis 14, with circular port 416 orthogonal to axis 14 and centered along axis 17. The testing device 426 has a paddle shape with opposing faces 246*a*, 246*b* only slightly tapered relative to vertical axis 17, with the recess 422 formed by walls 424*a*, 424*b* in the interior of port 416 configured to generally match that taper but create a slight wedging effect to ensure sealing with at least one, but preferably with both faces 446*a*, 446*b*. Tubular stem valve 74 containing rotary valve 84 and sealing ring 92 is as previously described, and may fit into and cooperate with a tube 460 located and preferably centered between the face 446*a*, 446*b*. The tube 460 can extend beyond the plane of the walls 424*a*, 424*b* and protrude from faces 446*a*, 446*b*. Alternatively, stem valve 474A, analogous to valve 274*a*, may fit into tube 460 with the tube modified accordingly as shown in FIG. 24. Retaining ring 430 fastens to port 416 to hold the testing device 426 and sealing device 428 (FIG. 26) in place. External threads are shown on port 416 and retaining ring 430.

The testing device has a disc shaped top 440 with tube 460 ending above, or as depicted, at the surface of the disc. The top 440 blocks the entire circular opening of port 416. The walls 446 are symmetric about a plane through axis 17 and perpendicular to axis 14, and spaced apart a short distance with sidewall 454 joining the opposing faces 446. A ring seal (not shown) analogous to seal 48 can be used on one or both of the device faces 446*a*, 446*b*, but a surface seal is depicted in the figures where the portion of the faces 446 engaging walls 424 wedge together to form a fluid tight seal. Optionally, a sealing surface 445 may be formed on the peripheral sides and edges of the faces 446 and sidewall 454 of a more flexible elastomer in order to increase sealing efficiency. Alternatively, the sealing surface 445 may be harder and the walls 424 of the recess 422 may have a layer of softer sealing material on them. A continuous raised rib seal analogous to rib 50 (FIG. 3) may be used. All of the seal variations described relative to testing devices 26, 226, 426 may be used on any of the testing devices.

The tube 460 has upstream opening 462 and downstream opening 464 that are preferably offset, with the upstream opening lower (further from the port 416) than the downstream opening 464. The openings 462, 464 are preferably sized and spaced so a cigarette butt can pass through them under testing pressure, and preferably at half the testing pressure. Since the tube 460 extends beyond the faces 446, there is no walled recess leading to the openings 462 or 464. While the opening 462 is shown toward the middle of the fitting fluid passage, it could be located more toward the bottom of the fitting 410 (away from port 416), or closer to the port 416.

The use of the testing device 426 is as previously described and is not repeated. The testing device 426 may be used with the dual valve stem assembly that includes valve 74 and rotary valve 84, or it may be used with the two-position valve 274*a*, as may the other testing devices 26, 226. FIG. 24 shows the two-position valve 274*a*.

Figure 26:
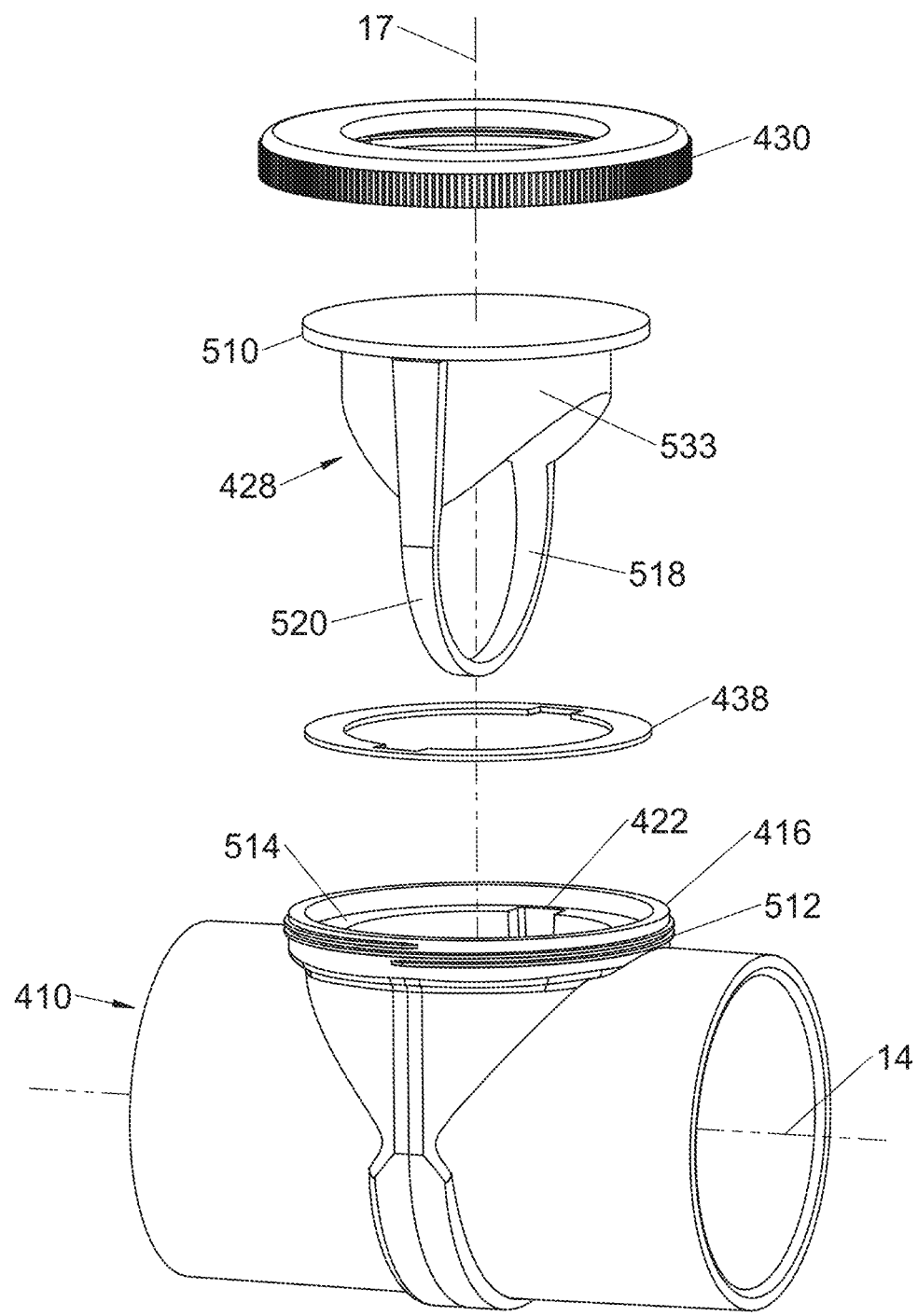
FIG. 26 is an exploded perspective view of the fitting of FIG. 22 with a sealing device.

Referring to FIGS. 25-26, after testing is completed the testing device 426 is removed and a sealing device 428 is inserted and fastened to the fitting 410 with retaining ring 430. The sealing device 428 is configured to fill the recess 422 and to fill the cylindrical portion of port 416 extending to the cylindrical portion of the fitting 410 extending along axis 16, in order to provide a smooth and preferably straight flow path through the fitting 410. A ring seal 438 may be interposed between the retaining ring 430 and sealing device 428, or between the sealing device 428 and the fitting 410. In FIG. 26 the seal 438 comprises a flat, gasket type seal with cutouts for the recess 422, that abuts a ledge or shoulder 514 on the port 416 adjacent the opening to the port 416. A circular ring 510 on sealing device 428 abuts the seal 438 to squeeze it against the shoulder 514 on fitting 410 to prevent leakage. In the depicted embodiment the retaining ring 430 is threaded onto the outside of the port 416 using threads 512.

The sealing device 428 has side 520 shaped like a U-shaped strip of material sized to fit into recess 422, with opposing ends of the U-shaped strip depending from the bottom side of the top 40. The inside of the side 520 forms walls 518 forming the bottom part of a cylindrical passage. The sealing device also fills the port to provide a continuous flow surface through the fitting 410, so generally V-shaped sidewalls 533 curve from the side 520 toward the top 410 with the inside 518 of the sidewalls 533 forming the top portion of cylindrical passage through the fitting.

The sidewalls 533 resemble the intersection of two equally sized cylinders extending along axis 17 and 14. The top 510 may be annular, may be a flat disc, or may be recessed to conform to the cylindrical shape of inner walls 518. A boss 128 (FIG. 11) may be used to mount a decorative plate as previously described.

In all of the above embodiments the port 16, 216, 416 is preferably large enough for use as a cleanout, allowing the spacing as initially described between walls 24*a*, 24*b*. In all of the above embodiments the opening to port 16, 216, 416 is preferably at or as close to the exterior wall 18 as possible in order to reduce the height of the fitting along axis 17.

The various testing devices 26, 226 and 426 provide means for blocking fluid flow through the fitting 10. The various sealing devices 28, 228 and 428 provide means for sealing the port in the fitting and providing a smooth flow path through the fitting. Inserts 152, 170 provide means for adapting cast iron fittings for use with the testing and/or sealing devices described herein.

The present fitting 10 and associated pressure testing device 26 and cleanout-seal device 28 form improvements on prior devices such as the slide assemblies of U.S. Pat. Nos. 6,655,413 and 6,997,041, the complete contents of which are incorporated herein by reference. Those prior devices are not believed to provide the simplified structure, sealing and operational aspects of the present invention.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

The invention claimed is:

1. A removable pressure testing device for use in testing the pressure in a pipe line having an interior diameter and having a fitting with a flow path through the fitting along a longitudinal axis of the flow path, the fitting having a port and a recess encircling a portion of the flow path opposite the port and into which the testing device is inserted to block fluid flow through the fitting for testing, the pressure testing device sized to removably fit through the port during use, the pressure testing device comprising:

a circular top sized to mate with the port, a continuous sidewall extending between two opposing sides of the circular top and depending from the top a distance sufficient to block the flow path when the device is inserted into the fitting through the port;

two opposing faces joined to the sidewall and to the top to form an enclosed structure, one face being an upstream face and the other a downstream face, an axial distance between the faces being greater adjacent the top than at a distal end of the faces to form a wedge shape with the faces inclined at an angle of 14 to 40 degrees relative to each other, wherein at least one of the faces forming a fluid tight seal with the recess in the fitting during use is overmolded onto the pressure testing device;

a first opening in the upstream face, the first opening being located to be placed within the fluid flow path through the fitting when the testing device blocks flow through the fitting;

a second opening in the downstream face, the second opening being located to be placed within the fluid flow path through the fitting when the testing device blocks flow through the fitting;

a first fluid passage placing the first and second openings in fluid communication;

a first valve extending through a valve passage in the pressure testing device, the first valve having a first closed position that blocks flow through the first fluid passage and having a second open position that allows flow through the first fluid passage.

2. The pressure testing device of claim 1, wherein the at least one of the overmolded faces comprises a thermoplastic elastomer.

3. The pressure testing device of claim 1, wherein the at least one of the overmolded faces comprises an ethylene propylene diene monomer.

4. The pressure testing device of claim 1, wherein the first valve further comprises a tubular stem valve.

5. The pressure testing device of claim 4, wherein the first valve includes a first valve surface on a distal end of the tubular stem valve cooperating with a mating valve surface on the first opening to form the first and second positions of the tubular stem valve.

6. The pressure testing device of claim 4, wherein the pressure testing device further comprises a tube located between the faces and in fluid communication with at least one of the first and second openings in the faces, a portion of the stem valve extending through the tube.

7. The pressure testing device of claim 6 wherein a portion of the stem valve translates within the tube between the first and second positions.

8. The pressure testing device of claim 6, further comprising a second valve manually actuatable independent of the first valve, the second valve being in fluid communication through a second fluid passage in the pressure testing device and the first fluid passage, the second valve having a second valve outlet that is accessible externally of the testing device and having a first closed position blocking flow through the second valve outlet and further having a second open position allowing fluid flow through the first valve and the second valve outlet to the first fluid passage.

9. The pressure testing device of claim 8, wherein the second valve comprises a rotary valve located in the first tubular stem valve.

10. A pressure testing assembly for use in testing the pressure in a pipe line having an interior diameter and having walls defining a flow path through the fitting along a longitudinal axis, the pressure testing assembly comprising:

a fitting comprising:

a port having interior walls defining an opening that is accessible from outside the fitting, the opening being centered on a central axis intersecting with and orthogonal to the longitudinal axis, the port having threads thereon encircling the central axis;

two oppositely inclined, flat recess walls on opposing sides of the centerline, each flat wall defining an opening through which the flow path and longitudinal axis pass, the walls spaced apart a distance sufficient so that a ball about 5 inches smaller than the nominal diameter of the pipeline, can pass through the port and the flow path in the fitting, the flat walls opposite the port being closer together, the fitting walls defining a recess that at least partially encircles the flow path and opens to the circular port;

a pressure testing device inserted into the recess to pressure test the pipe line, the pressure testing device, comprising:

a circular top having two opposing surfaces, the top having a diameter larger than the interior diameter of the pipeline and sized to mate with the circular port;

a continuous sidewall located between the opposing surfaces, the sidewall extending between opposing sides of the top and depending from the top a distance sufficient to fit into the recess in the fitting and block the flow path when the device is inserted into the fitting;

two, opposing faces joined to the sidewall and to the top to form an enclosed structure, each face joined to one of the surfaces on the top, one face being an upstream face and the other a downstream face, wherein at least one of the faces is overmolded onto the device and configured to form a fluid tight seal with one of the recess walls in the fitting;

a first opening in the upstream face, the first opening located within the fluid flow path through the fitting;

a second opening in the downstream face, the second opening being located within the fluid flow path through the fitting;

a fluid passage placing the first and second openings in fluid communication;

a stem valve having a first position that blocks flow from the first opening to the second opening and a second position that allows flow through the first and second openings, a retaining ring removably fastened to the fitting to hold the pressure testing device within the fitting; and a sealing ring encircling the port to provide a fluid tight seal.

11. The pressure testing assembly of claim 10, wherein the at least one of the faces is overmolded with a thermoplastic elastomer.

12. The pressure testing assembly of claim 10, wherein the at least one of the faces is overmolded with an ethylene propylene diene monomer.

13. The pressure testing assembly of claim 10, wherein the opposing fitting walls are inclined at an angle of about 7-20 degrees to a plane containing the central axis and orthogonal to the longitudinal axis, and wherein the faces of the pressure testing device face an adjacent fitting wall and are inclined at about the same angle as the adjacent fitting wall.

14. The pressure testing assembly of claim 10, wherein the pressure testing device further comprises a tube located between the faces and in fluid communication with at least one of the first and second openings in the faces, a portion of the stem valve extending through the tube.

15. The pressure testing assembly of claim 14, wherein the stem valve and tube have mating threads with the stem valve being rotated to translate between the first and second positions.

16. The pressure testing assembly of claim 10, wherein the stem valve comprises a tubular valve stem having a fluid passage therethrough, and further comprising a rotary valve located in the tubular valve stem, the second valve being in fluid communication with the fluid passage through the valve stem and having a first position allowing fluid flow through the tubular valve stem and through the second valve outlet, the second valve having a second position blocking flow through the second valve outlet.

17. A pressure testing assembly for pipelines with a valve assembly, comprising:
  a fitting having walls defining a flow path through the fitting;
  a port encircling a circular opening in a plane perpendicular to a longitudinal axis of the port and about which the circle is centered, the opening located on one side of the fitting, the opening large enough for a cleanout device, the fitting having walls defining at least a portion of a single recess around the flow path and opening onto the port, the recess being configured to allow the cleanout device to pass through the fitting by having an opening no smaller than 0.5 inches smaller than a nominal size of the pipeline;
  a test device configured to fit into the recess and form a fluid tight seal with at least one wall of the recess to block flow through the flow path through the fitting, the test device having an opening on each of an upstream and downstream side of the device when inserted into the recess with the upstream and downstream openings being in fluid communication and located on opposing faces of the test device which faces are inclined at an angle of about 7-20 degrees to a plane containing the longitudinal axis and perpendicular to the flow axis and which faces are overmolded onto the test device;
  a valve assembly located in the test device and having a first valve with an end of the valve assembly being externally accessible to operate the first valve, the first valve being in fluid communication with the upstream and downstream openings to open and close fluid flow through the upstream and downstream openings, the first valve having a fluid flow path therethrough in fluid communication with a second valve.

18. The pressure testing assembly of claim 17, wherein the port has a longitudinal port axis and the sidewall is curved about that longitudinal port axis.

19. The pressure testing assembly of claim 17, wherein the overmolded faces comprise a thermoplastic elastomer.

20. The pressure testing assembly of claim 17, wherein the overmolded faces comprise an ethylene propylene diene monomer.

21. The pressure testing assembly device of claim 17, further comprising a threaded retaining ring configured to threadingly engage mating threads on the port to retain the test device in the port.

* * * * *